(12) United States Patent
Gerasopoulos et al.

(10) Patent No.: US 11,894,515 B2
(45) Date of Patent: Feb. 6, 2024

(54) ELECTROCHEMICAL CELLS AND ELECTROLYTES CONTAINED THEREIN

(71) Applicant: The Johns Hopkins University, Baltimore, MD (US)

(72) Inventors: Konstantinos Gerasopoulos, Odenton, MD (US); Bing Tan, Ann Arbor, MI (US); Spencer A. Langevin, Columbia, MD (US); Matthew W. Logan, Columbia, MD (US); Adam W. Freeman, Laurel, MD (US)

(73) Assignee: The Johns Hopkins University, Baltimore, MD (US)

( * ) Notice: Subject to any disclaimer, the term of this patent is extended or adjusted under 35 U.S.C. 154(b) by 371 days.

(21) Appl. No.: 16/859,057

(22) Filed: Apr. 27, 2020

(65) Prior Publication Data

US 2020/0411906 A1 Dec. 31, 2020

Related U.S. Application Data

(60) Provisional application No. 62/867,958, filed on Jun. 28, 2019.

(51) Int. Cl.
| | |
|---|---|
| *H01M 10/0565* | (2010.01) |
| *C08K 3/105* | (2018.01) |
| *C08J 3/24* | (2006.01) |
| *C08K 3/08* | (2006.01) |
| *C08K 5/156* | (2006.01) |
| *C08K 3/11* | (2018.01) |
| *C08F 220/28* | (2006.01) |

(52) U.S. Cl.
CPC ..... *H01M 10/0565* (2013.01); *C08F 220/286* (2020.02); *C08J 3/24* (2013.01); *C08K 3/08* (2013.01); *C08K 3/105* (2018.01); *C08K 3/11* (2018.01); *C08K 5/156* (2013.01); *H01M 2300/0082* (2013.01); *H01M 2300/0085* (2013.01)

(58) Field of Classification Search
None
See application file for complete search history.

(56) References Cited

U.S. PATENT DOCUMENTS

| | | | |
|---|---|---|---|
| 5,593,795 A * | 1/1997 | Chen | C08G 65/3342 429/189 |
| 11,387,488 B2 * | 7/2022 | Gerasopoulos ... | H01M 10/0565 |
| 11,430,984 B2 | 8/2022 | Freeman et al. | |

(Continued)

OTHER PUBLICATIONS

U.S. Appl. No. 17/865,867, filed Jul. 15, 2022, Gerasopoulos et al.

(Continued)

*Primary Examiner* — Laura Weiner
(74) *Attorney, Agent, or Firm* — Sung T. Kim

(57) ABSTRACT

Gel polymer electrolyte compositions including a cross-linked three-dimensional polymer network and an electrolyte composition comprising an electrolyte and water are disclosed. The gel polymer electrolyte compositions can be included in an aqueous electrochemical cell, in which a gel polymer electrolyte can be positioned between an anode and a cathode. Methods of forming a gel polymer electrolyte in the form of a film, and methods of forming an aqueous electrochemical cell including a gel polymer electrolyte, are also disclosed.

7 Claims, 9 Drawing Sheets

(56) References Cited

U.S. PATENT DOCUMENTS

| | | | | |
|---|---|---|---|---|
| 2015/0349310 | A1* | 12/2015 | Viner | H01M 10/0565 |
| | | | | 429/126 |
| 2019/0237803 | A1* | 8/2019 | Gerasopoulos ... | H01M 10/0565 |
| 2019/0379040 | A1 | 12/2019 | Gerasopoulos et al. | |
| 2020/0343586 | A1 | 10/2020 | Gerasopoulos et al. | |
| 2022/0102751 | A1 | 3/2022 | Gerasopoulos et al. | |

OTHER PUBLICATIONS

U.S. Appl. No. 17/748,371, filed May 19, 2022, Gerasopoulos et al.
Meylan, W.M. and Howard, P.H., "Atom/Fragment Contribution Method for Estimating Octanol-Water Partition Coefficients", J. Pharm. Sci., vol. 84, Issue 1, pp. 83-92, 1995.
Eds. Brandrup, J; Immergut, E.H.; Grulke, E.A., "Polymer Handbook", 4th Edition, John Wiley & Sons, New York, 1999.

* cited by examiner

ELECTROCHEMICAL CELLS AND ELECTROLYTES CONTAINED THEREIN

CROSS-REFERENCE TO RELATED APPLICATIONS

This application claims priority under 35 U.S.C. § 119(e) to U.S. Provisional Patent Application Ser. No. 62/867,958, filed on Jun. 28, 2019, which is expressly incorporated by reference herein in its entirety.

STATEMENT REGARDING FEDERALLY SPONSORED RESEARCH OR DEVELOPMENT

This invention was made with Government support under Contract No. N00024-13-D-6400 awarded by the United States Department of the Navy. The Government has certain rights in the invention.

TECHNICAL FIELD

Embodiments of the presently-disclosed invention relate generally to gel polymer electrolyte compositions (e.g., pre-cured), gel polymer electrolytes, and electrochemical cells including the same.

BACKGROUND

The majority of today's rechargeable batteries are based on lithium-ion chemistry. While lithium-ion batteries possess the highest energy density among rechargeable systems, they suffer from safety concerns. A prominent safety concern is related to the organic electrolyte utilized in such batteries. The combination of the organic electrolyte, which is flammable, with an oxygen-rich cathode can cause or be vulnerable to a thermal runaway that can lead to fire and explosion. As a result, lithium-ion batteries require very stringent packaging and thermal management systems to ensure safety. These management systems add a significant and undesirable weight to the battery and unavoidably limit lithium-ion battery architectures to rigid form factors (e.g., rigid casings, etc.). However, several commercial applications including autonomous systems, portable expeditionary power, and/or wearable/biomedical sensors require flexible, lightweight, and safe batteries that do not sacrifice energy density.

SUMMARY OF INVENTION

Certain embodiments according to the invention provide a gel polymer electrolyte (GPE) comprising a cross-linked three-dimensional polymer network, in which the cross-linked three-dimensional polymer network comprises a reaction product of a three-dimensionally cross-linkable monomeric mixture. The GPE may further comprise an electrolyte composition that includes at least one electrolyte and water, wherein the GPE has a concentration of the at least one electrolyte from about 40 wt. % to about 90 wt. %.

In another aspect, the present invention provides an electrochemical cell comprising an anode, a cathode, and a GPE positioned between and in contact with the anode and the cathode. The GPE of the electrochemical cell may comprise a GPE-composition including a cross-linked three-dimensional polymer network and an electrolyte composition absorbed by the GPE, wherein the electrolyte composition comprises at least one electrolyte and water. The GPE-composition may have a concentration of the at least one electrolyte from about 40 wt. % to about 90 wt. %.

In another aspect, the present invention provides a method of forming a GPE. The method for forming the GPE may comprise providing a pre-cured composition comprising a three-dimensionally cross-linkable monomeric mixture, at least one electrolyte, and water; wherein the pre-cured composition has a concentration of the at least one electrolyte from about 40 wt. % to about 90 wt. %. The method of forming the GPE may also comprise radically-curing the pre-cured composition to form the GPE.

In yet another aspect, the present invention provides a deep eutectic solvent (DES)-containing GPE. The GPE may comprise a cross-linked three-dimensional polymer network comprising a reaction product of a three-dimensionally cross-linkable monomeric mixture and an electrolyte composition. The electrolyte composition may comprise (i) a DES component having a eutectic point of less than or equal to 25° C. and (ii) a water-in-salt (WiS) or a water-in-bisalt (WiBS) component comprising at least one electrolyte and water. The WiS or the WiBS component may have a concentration of the at least one electrolyte from about 20 wt. % to about 90 wt. %.

In another aspect, the present invention provides an electrochemical cell including a DES-containing GPE. The electrochemical cell may include an anode, a cathode, and a GPE positioned between and in contact with the anode and the cathode. The GPE includes a GPE-composition comprising a polymer network and an electrolyte composition absorbed by the GPE. The electrolyte composition may comprise (i) a DES component having a eutectic point of less than or equal to 25° C. and (ii) a WiS or a WiBS component comprising at least one electrolyte and water.

In another aspect, the present invention provides a method of forming a DES-containing GPE. The method may comprise combining (i) a DES solution, (ii) a monomer-containing composition, and (iii) a WiS or a WiBS component including at least one electrolyte and water to form a GPE-precursor composition. The method may further comprise radically-curing the GPE-precursor composition to form the GPE.

BRIEF DESCRIPTION OF THE DRAWINGS

Embodiments of the invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
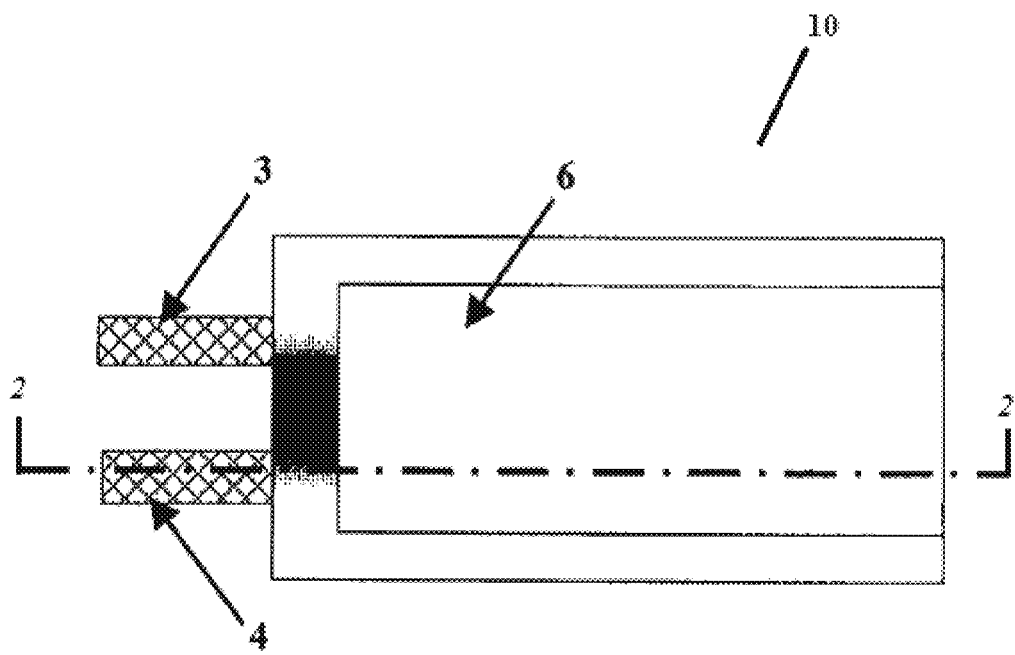
FIG. 1 illustrates an electrochemical cell according to certain embodiments of the invention.

Embodiments of the invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Embodiments of the present invention relate generally to gel polymer electrolyte (GPE) compositions (e.g., pre-cured), GPEs (e.g., cured form), and electrochemical cells containing such GPEs. In accordance with certain embodiments of the invention, electrochemical cells including a GPE, such as those described and disclosed herein, may have an improved ionic conductivity. In accordance with certain embodiments of the invention, the GPE may comprise a three-dimensional cross-linked polymer film that may be characterized as a hydrogel (e.g. a cross-linked three-dimensional polymer network/matrix in which an electrolyte composition may be absorbed therein), in which the GPE may contain aqueous-based salts, a deep eutectic solvent (DES), and/or a viscosity reducing agent. In accordance with certain embodiments of the invention, the GPE compositions may be radically-cured (e.g., UV-cured or thermally cured) in to the form of a GPE for use in an electrochemical cell. In accordance with certain embodiments of the invention the GPEs and electrochemical cells including GPEs may be incorporated into, for example, wearable sensors, implantable devices, electric vehicles, batteries, sensors, capacitors, structurally-flexible electronics, and other energy storage devices.

In accordance with certain embodiments of the invention, for instance, the GPE compositions and/or GPE may comprises notably increased levels of electrolyte therein. For example, the GPE compositions and/or GPE may be considered "super concentrated" by having a molar concentration of electrolyte (e.g., salt) content exceeding 35M or a weight percent of electrolyte (e.g., salt) exceeding 40% or more as discussed below. In accordance with certain embodiments of the invention, GPE compositions and/or GPEs may comprise an electrolyte composition comprising the combination of a (i) DES component having a eutectic point of less than or equal to 25° C. and (ii) a water-in-salt (WiS) or a water-in-bisalt (WiBS) component comprising at least one electrolyte and water. Electrochemical cells including such GPEs, in accordance with certain embodiments of the invention, may have increased ionic conductivity at reduced water content. In accordance with certain embodiments of the invention, the integration of the combination of the DES and WiS or WiBS into the polymer network of the GPE may beneficially improve cycle life compared to the use of a DES alone as an electrolyte composition.

In one aspect, certain embodiments according to the invention provide a GPE-composition (e.g., pre-cured) including a three-dimensionally cross-linkable monomeric mixture, and an electrolyte composition comprising at least one electrolyte and water. In accordance with certain embodiments of the invention, the electrolyte composition may have a weight percent of salt from about 40% to about 90% (e.g., 40-90 wt. % of salt), such as at least about any of the following: 40, 45, 50, 55, 65, and 70 wt. % of salt and/or at most about any of the following: 90, 85, 80, 75, 70, 65, 60, and 55 wt. % of salt. In accordance with certain embodiments of the invention, the three-dimensionally cross-linkable monomeric mixture may be radically cured, such as by a UV-curing and/or thermal curing. For example, the GPE-composition may also include a thermal initiator to facilitate thermal curing of the GPE-composition to form a GPE suitable for incorporation within an electrochemical cell.

In accordance with certain embodiments of the invention, the chemistry for forming the GPE-compositions may be based upon the radically mediated addition (e.g., via UV or thermal initiation) of thiols to olefins (thiol-ene/thiol-yne/hydrothiolation), which may be used to make three-dimensional cross-linked networks when monomers possessing two or more thiols are reacted with other olefinic monomers possessing two or more vinyl or alkyne functional groups (e.g., monomers including at least two double bonds, at least one triple bond, or a combination thereof), in which the total of the (i) vinyl and/or alkyne functional groups and (ii) thiol functional groups across the combination of monomers is greater than or equal to five. In this context, each vinyl functionality (e.g., allyl, vinylether, (meth)acrylate, norbornene, etc.) can react with one thiol, and is thus considered monofunctional, whereas each alkyne is capable reacting with two thiols, and is thus considered difunctional. In accordance with certain embodiments of the invention, the properties of the network can be tuned by the structure, functionality, and stoichiometry of two or more monomers used to form the three-dimensional polymeric network or matrix.

In accordance with certain embodiments of the invention, a substantially water soluble monomer may be defined by (i) an actual or calculated water solubility, (ii) a log(P) value, or (iii) a combination thereof. The individual monomers reacted to form the three-dimensional polymer network may be soluble (actual or calculated as noted below) in water at 25° C. from at least about any of the following: 10, 15, 20, 25, 30, 35, 40, 50, 60, 70, 80, 90, 100, and 110 g/L (actual or calculated as noted below) and/or at most about 250, 225, 200, 190, 180, 170, 160, 150, 140, 130, 120, and 110 g/L (actual or calculated as noted below). In accordance with certain embodiments of the invention, one or more (e.g., all) of the monomers are completely miscible with water in all proportions. In accordance with certain embodiments of the invention, the combination of monomers may be soluble in water at 25° C. from at least about any of the following: 40, 50, 60, 70, 80, 90, 100, and 110 g/L (actual or calculated as noted below) and/or at most about 250, 225, 200, 190, 180, 170, 160, 150, 140, 130, 120, and 110 g/L (actual or calculated as noted below). In accordance with certain embodiments of the invention, the combination of all monomers are completely miscible with water in all proportions. Additionally or alternatively, the water solubility of the substantially water soluble monomers may have or be characterized, at least in part, by the logarithm of an octanol-water partition coefficient (P) of the individual monomers and/or the weighted average of all of the monomers reacted to form the three-dimensional polymer network. Log(P), or the octanol-water partition coefficient is a physical property used extensively to describe a chemical's lipophilic or hydrophobic properties. Log(P) is the ratio of a chemical's concentration in the octanol-phase to its concentration in the aqueous phase of a two-phase system at equilibrium. Since measured values of 'P' range from less than 104 to greater than 10 (at least 12 orders of magnitude), the logarithm (log P) is commonly used to characterize its value. Log(P) is a valuable parameter in numerous quantitative structure-activity relationships (QSAR). In this regard, for instance, the water solubility of the substantially water soluble monomers may be defined by the log(P) value of the individual monomers and/or the weighted average of the monomers. In accordance with certain embodiments, the individual monomers and/or the weighted average of all of the monomers may have a value of 4.0 or less (e.g., 3.0 or less, 2.0 or less, 1.0, or less, or less than 0.0). For example, the individual monomers reacted to form the three-dimensional polymer network may comprise a log(P) value of at most about any of the following: 4.0, 3.5, 3.0, 2.5, 2.0, 1.5, and 1.0 and/or at least about −2.0, −1.5, −1.0, −0.5, 0.0, 0.5, and 1.0. In accordance with certain embodiments, the weighted average of the monomers reacted to form the three-dimensional polymer network may comprise a log(P) value of at most about any of the following: 4.0, 3.5, 3.0, 2.5, 2.0, 1.5, and 1.0 and/or at least about −2.0, −1.5, −1.0, −0.5, 0.0, 0.5, and 1.0. In this regard, the determination of the log(P) for the weighted average of the monomers reacted to form the three-dimensional polymer network may be determined by general Equation (1):

$$\log(P)_{weighted\ average} = X^*[\log(P)_1] + Y^*[\log(P)_2] + Z^*[\log(P)_3] \quad \text{Equation (1);}$$

where X, Y, and Z . . . are the weight % of respective monomers and $\log(P)_1$, $\log(P)_2$, and $\log(P)_3$ are the respective log(P) values of the individual monomers reacted to form the three-dimensional polymer network. Although general Equation (1) illustrates a calculation using three (3) monomers, this equation can be modified to account for reaction systems including only two (2) monomers or more than three (3) monomers.

As noted above, a substantially water soluble monomer may be defined by (i) an actual or calculated water solubility, (ii) a log(P) value, or (iii) a combination thereof. Table 1 lists a variety of monomers along with their respective calculated water solubility as well as their respective log(P) value. Although the water solubility of a monomer can be readily determined by one of skill in the art by addition of the monomer in question to water at a controlled temperature, such determination can be time consuming. In this regard, the use of calculated values may be more suitable for evaluation of monomers. For instance, the Environmental Protection Agency (EPA) of the United States has developed a set of software tools that can calculate the estimated water solubility of organic compounds based on their molecular structures and the sum of the relative solubility contributions of the molecular fragments from which they are comprised. The WATERNT program and estimation methodology were developed at Syracuse Research Corporation for the EPA. The estimation methodology is based upon a "fragment constant" method very similar to the method of the WSKOWWIN Program, which estimates octanol-water partition coefficients. A journal article by Meylan and Howard (Meylan, W. M. and Howard, P. H. J. Pharm. Sci. 1995, 84, 83-93.), which is incorporated in its entirety by reference, describes the WSKOWWIN program methodology—the same methodology was used to derive "fragment constant" values for WATERNT. The water solubilities are estimated either directly from the fragment analysis using the WATERNT program, or indirectly from the log P value, which is determined using the WSKOWWIN program. Table 1 lists the calculated water solubilities calculated using the WSKOWWIN program. Also included in Table 1 are the corresponding values of log P for the compounds listed.

TABLE 1

Water Solubilities and log(P) Values:
U.S. EPA 2018 Estimation Programs Interface Suite ™ for Microsoft ® Windows, v 4.11. United States Environmental Protection Agency, Washington, DC, USA.

| Molecule | CAS No. | Water Solubility @ 25 C (mg/L) | Log P |
|---|---|---|---|
| N,N'-Diallyltartramide | 58477-85-3 | 29810 | −1.51 |
| Poly(ethylene glycol) methyl ether acrylate | 32171-39-4 | 40000 | −0.64 |
| 2,2'-thiodiethanol | 111-48-8 | 340000 | −0.63 |
| DL-Dithiothreitol | 3483-12-3 | 185600 | −0.48 |
| Pentaerythritol allyl ether | 91648-24-7 | 88860 | −0.22 |
| Carboxyethyl acrylate | 24615-84-7 | 236000 | −0.02 |
| Poly(ethylene glycol) diacrylate | 26570-48-9 | 6306 | 0.02 |
| Di (ethylene glycol) divinyl ether | 764-99-8 | 44580 | 0.23 |
| Acrylic acid | 79-10-7 | 168000 | 0.35 |
| N-vinyl pyrrolidone | 88-12-0 | 52090 | 0.37 |
| Trimethylopropane ethoxylate triacrylate, MW = 692 | 28961-43-5 | 18 | 0.39 |
| 2-Hydroxyethyl methacrylate | 868-77-9 | 117900 | 0.47 |
| 2,2'-(Ethylenedioxy)diethanethiol | 14970-87-7 | 14590 | 0.66 |
| Vinyl acetate | 108-05-4 | 30250 | 0.73 |
| Di(ethylene glycol) diacrylate | 4074-88-8 | 7082 | 0.84 |
| Ethylene glycol diacrylate | 11/5/2274 | 6863 | 1.11 |
| Tetra (ethylene glycol) diacrylate | 17831-71-9 | 998.8 | 1.26 |
| Ethylene glycol bis(mercaptopropionate) | 22504-50-3 | 2238 | 1.27 |
| Ethyl acrylate | 140-88-5 | 8717 | 1.32 |
| Methyl methacrylate | 80-62-6 | 7747 | 1.38 |
| Allyl ether | 557-40-4 | 3728 | 1.76 |
| Tri(propylene glycol) diacrylate | 42978-66-5 | 342.2 | 1.82 |
| Di(ethylene glycol) dimethacrylate | 2358-84-1 | 581.5 | 1.93 |
| 1,3-butanediol diacrylate | 19485-03-1 | 836.7 | 2.02 |
| 1,4-butanediol diacrylate | 1070-70-8 | 724.1 | 2.1 |
| Ethylene glycol dimethacrylate | 97-90-5 | 580.5 | 2.21 |
| Butyl acrylate | 141-32-2 | 902.1 | 2.36 |
| Neopentyl glycol diacrylate | 2223-82-7 | 290.3 | 2.48 |
| Pentaerythritol tetrakis(mercaptopropionate) | 7575-23-7 | 5.22 | 2.59 |

TABLE 1-continued

Water Solubilities and log(P) Values:
U.S. EPA 2018 Estimation Programs Interface Suite ™ for
Microsoft ® Windows, v 4.11. United States
Environmental Protection Agency, Washington, DC, USA.

| Molecule | CAS No. | Water Solubility @ 25 C (mg/L) | Log P |
|---|---|---|---|
| Allyl sulfide | 592-88-1 | 620.5 | 2.61 |
| Butyl methacrylate | 97-88-1 | 284.6 | 2.88 |
| Styrene | 100-42-5 | 343.7 | 2.95 |
| 1,3-benzenedimethanethiol | 105-09-9 | 176.5 | 2.98 |
| trimethylolpropane tris(mercaptopropionate) | 33007-83-9 | 7 | 3.1 |
| Diallyl phthalate | 131-17-9 | 43.27 | 3.23 |
| Bisphenol A glycerolate (1 glycerol/phenol) diacrylate | 4687-98-9 | 0.46 | 3.85 |
| Neopentyl glycol propoxylate (1PO/OH) dimethacrylate | n/a | 2.86 | 3.86 |
| 2-Ethyl hexylacrylate | 103-11-7 | 16.8 | 4.09 |
| 1,12-Dodecanediol dimethacrylate | 72829-09-5 | 0.01 | 7.12 |

In accordance with certain embodiments of the invention, for example, the cross-linkable monomers may be radically cured to provide a cross-linked three-dimensional polymer network comprising the reaction product of at least a first monomer including at least three (3) thiol functional groups and a second monomer including at least two (2) vinyl functional groups (e.g., functional groups including at least one double bond) or at least one (1) alkyne functional groups (e.g., functional groups including at least one triple bond). In accordance with certain embodiments of the invention, for example, the second monomer can comprise an acrylate and/or methacrylate groups among other groups having double and/or triple bonds as discussed in more detail below. For instance, the second monomer may comprise an acrylate or methacrylate group, an allylic group, an alkyne group, a styrenic group, a vinyl ether group, a vinyl ester group, a vinyl amide group, a maleate group, a fumarate group, a crotonate group, a cinnamate group, or a norbornene group. In this regard, the first monomer including at least three (3) thiol functional groups facilitates the formation of the three-dimensional characteristic of the GPE. In accordance with certain embodiments of the invention, the cross-linked three-dimensional polymer network may comprise the reaction product of the first monomer, the second monomer, and a third monomer including at least two (2) thiol groups, wherein the first monomer and the third monomer are different. In accordance with certain embodiments of the invention, the first polymer may comprise at least two (2) thiol functional groups and the second monomer may comprise at least three (3) vinyl or (2) two alkyne functional groups. In this regard, the cross-linked three-dimensional polymer network may comprise the reaction product of the first polymer that includes at least two (2) thiol functional groups and the second monomer that includes at least three (3) vinyl or (2) two alkyne functional groups, in which the second monomer in such embodiments of the invention facilitates the formation of the three-dimensional characteristics of the GPE.

In accordance with certain embodiments of the invention, example Reaction Scheme (1) below illustrates the combination of monomers cured in an aqueous medium including a lithium salt to provide a cross-linked three-dimensional polymeric network:

REACTION SCHEME (1)

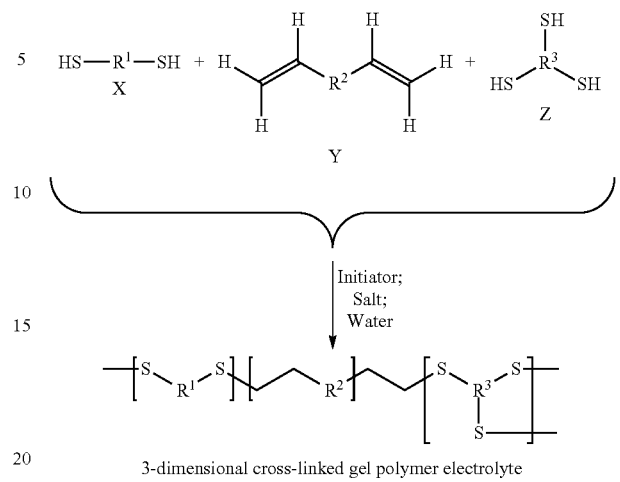

3-dimensional cross-linked gel polymer electrolyte

In example Reaction Scheme (1), in accordance with certain embodiments of the invention, '$R^1$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2,2'-thiodiethanethiol, 1,2-ethanethiol, 1,3-propane thiol, 2,3-dimercapto-1-propanol, 1,4-butane thiol, 2,3-butanedithiol, 1,3-benzenedithiol, 1,2-benzenedimethanethiol, 1,3-benzenedimethanethiol, benzene-1,2-dithiol, benzene-1,3,-dithiol, poly(ethylene glycol)dithiol, poly(propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethylene glycol bis(3-mercaptopropionate), and ethylene glycol bismercaptoacetate. Monomers based on short aliphatic chains ($C_1$-$C_6$), those possessing hydroxyl (OH), ethylene glycol/oxide (EO), or propylene glycol/oxide (PO) functionality, or combinations thereof, such as 2,2'-thiodiethanethiol, 2,3-dimercapto-1-propanol, poly(ethylene glycol)dithiol, poly (propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethylene glycol bis(3-mercaptopropionate), and ethylene glycol bismercaptoacetate are more water-soluble, and may thus be more preferred in accordance with certain embodiments of the invention.

In example Reaction Scheme (1), in accordance with certain embodiments of the invention, '$R^2$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2-methacryloyloxyethyl acrylate (ethylene glycol acrylate methacrylate), 1,4-butanediol divinyl ether, 1,4-cyclohexanedimethanol divinyl ether, tri(ethylene glycol) divinyl ether, di(ethylene glycol) divinyl ether, poly(ethylene glycol) divinyl ether, diallyl phthalate, diallylpyrocarbonate, trimethylolpropane diallyl ether, allyl ether, allyl disulfide, allyl sulfide, N,N'- diallyltartramide, 1,2,-diallyl-1,2-cyclohexanediol, 1,4-diallyl-2,3,5,6-piperazonetetrone, 1,3-butanediol di(meth)acrylate, 1,4-butanediol di(meth)acrylate, 1,6,-hexane di(meth)acrylate, bisphenol A ethoxylate di(methacrylate), poly(ethylene glycol) di(meth)acrylate, ethylene glycol di(meth)acrylate, glycerol 1,3-diglycerolate di(meth)acrylate, di(ethylene glycol) di(meth)acrylate, neopentyl glycol di(meth)acrylate, tetra(ethylene glycol) di(meth)acrylate, poly(propylene glycol) di(meth)acrylate, tri(ethylene glycol) di(meth)acrylate, tri(propylene glycol) di(meth)acrylate, bisphenol A glycerolate (glycerol/phenol) di(meth)acrylate, 1,6,-hexanediol ethoxylate diacrylate, bisphenol F (2 EO/phenol), neopentyl glycol propoxylate (1 PO/OH) di(meth)acrylate, and trimethylolpropane ethoxylate (PO/OH) methyl ether di(meth)acrylate. Monomers based on short aliphatic chains ($C_1$-$C_6$), those possessing hydroxyl (OH), ethylene glycol/oxide (EO), or propylene glycol/oxide (PO) functionality, or combinations thereof, such as 1,4-butanediol divinyl ether, tri(ethylene glycol) divinyl ether, di(ethylene glycol) divinyl ether, poly(ethylene glycol) divinyl ether, diallyl phthalate, diallylpyrocarbonate, trimethylolpropane diallyl ether, allyl ether, allyl disulfide, ally sulfide, N,N'-diallyltartramide, 1,4-diallyl-2,3,4,5-piperazonetetrone, 1,3-butanediol di(meth)acrylate, 1,4-butanediol di(meth)acrylate, bisphenol A ethoxylate di(methacrylate), poly(ethylene glycol) di(meth)acrylate, ethylene glycol di(meth)acrylate, 2-methacryloyloxyethyl acrylate (ethylene glycol acrylate methacrylate), glycerol 1,3-diglycerolate di(meth)acrylate, di(ethylene glycol) di(meth)acrylate, neopentyl glycol di(meth)acrylate, tetra(ethylene glycol) di(meth)acrylate, poly(propylene glycol) di(meth)acrylate, tri(ethylene glycol) di(meth)acrylate, tri(propylene glycol) di(meth)acrylate, bisphenol A glycerolate (1 glycerol/phenol) di(meth)acrylate, 1,6,-hexanediol ethoxylate diacrylate, bisphenol F (2 EO/phenol), neopentyl glycol propoxylate (1 PO/OH) di(meth)acrylate, trimethylolpropane ethoxylate (1PO/OH) methyl ether di(meth)acrylate, and 2-methacryloyloxyethyl acrylate (ethylene glycol acrylate methacrylate) are more water-soluble, and may thus be more preferred in accordance with certain embodiments of the invention.

In example Reaction Scheme (1), in accordance with certain embodiments of the invention, '$R^3$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: trimethylolpropane tris(3-mercaptopropionate), trimethylolpropane tris(mercaptoacetate), pentaerythritol tris(3-mercaptoprionate), 2-hydroxymethyl-2-methyl-1,3-propanediol tris(3-mercaptopropionate), pentaerythritol tris(mercaptoacetate), tris[2-(3-mercaptopropionyloxyethyl]isocyanurate, 4 arm poly(ethylene glycol) tetrathiol, pentaerythritol tetrakis(3-mercaptopropionate), pentaerythritol tetrakis(mercaptoacetate), and dipentaerythritol hexa(3-mercaptopropionate).

In example Reaction Scheme (1), coefficients 'X', 'Y', and 'Z' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the moles of the monomer having three reactive thiol groups). For simplicity, the sum of 'X', 'Y', and 'Z' may be a value of 1.0 (e.g., accounts for 100% of the monomer content). In accordance with certain embodiments of the invention the coefficient 'X' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Z' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. For example only, reactant mixtures including equal amounts (e.g., in moles or % weight) of the three monomers in reaction scheme (1) would comprise coefficient values for each of 'X', 'Y', and 'Z' of ⅓ (i.e., X=⅓; Y=⅓; and Z=⅓). In accordance with certain embodiments of the invention, for example, 'Z' may comprise from about 0.01 to about 0.35 (e.g., 1-35% by weight of the total monomer weight), such as from about 0.02 to about 0.20 (e.g., 2-20% by weight of the total monomer weight) or from about 0.05 to about 0.15 (e.g., 5-15% by weight of the total monomer weight).

In example Reaction Scheme (1), in accordance with certain example embodiments of the invention, the mole ratios of the 'X' monomer (e.g., includes $R^1$) and the 'Y'' monomer (e.g., includes $R^2$) may be determined such that the ratio of the total number of moles of thiol groups and the total moles of vinyl groups in all of the monomers is approximately 1:1. For example, moles of thiols in the 'X' (e.g., includes R) monomer and the 'Z' monomer (e.g., includes $R^3$) is the same (or substantially the same) as the number of moles of vinyl groups in the 'Y'' monomer (e.g., includes $R^2$), or approximately 2:1 if and the 'Y'' monomer (e.g., includes $R^2$) has alkyne functionality. Table 1 provides a non-limiting example recipe for respective monomer content. Although not shown in Table 1, the non-limiting example recipe shown in Table 2 also includes 0.080 g of photo-initiator: 2,2-dimethoxy-2-phenylacetophenone (DMPA). In accordance with certain embodiments of the invention, the specific choice of photo-initiator may be varied and the amount can vary as described herein.

TABLE 2

Example Monomer Content in Reactant System

| Monomer | MW (g/mol): | Mass (g): | wt % | moles: | mole % | vinyl moles: | SH moles: | Funct. Grp Ratio |
|---|---|---|---|---|---|---|---|---|
| EEDET | 182.3 | 3.36 | 36.4 | 0.01843 | 0.414 | n/a | 0.037 | 40% |
| TEGDVE | 202.25 | 4.66 | 50.4 | 0.02304 | 0.517 | 0.046 | n/a | 50% |
| TMPTMP | 398.56 | 1.22 | 13.2 | 0.00306 | 0.069 | n/a | 0.009 | 10% |

TEGDVE = tri(ethylene glycol) divinyl ether
EEDET = 2,2'-(Ethylenedioxy)diethanethiol
TMPTMP = trimethylolpropane tris(3-mercaptopropionate)

In accordance with certain embodiments of the invention, example Reaction Scheme (2) below illustrates the combination of monomers cured in an aqueous medium including an alkali, alkaline earth metal, or zinc salt to provide a cross-linked three-dimensional polymeric network:

REACTION SCHEME (2)

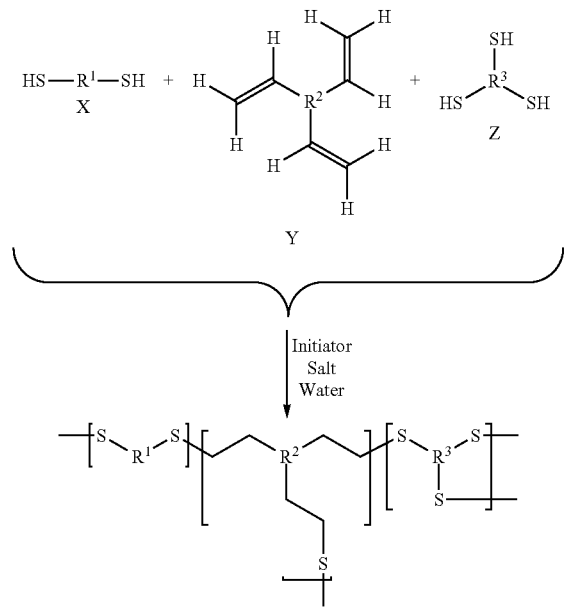

In example Reaction Scheme (2), in accordance with certain embodiments of the invention, 'R$^1$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: 2,2'-thiodiethanethiol, 1,2-ethanethiol, 1,3-propane thiol, 2,3-dimercapto-1-propanol, 1,4-butane thiol, 2,3-butanedithiol, 1,3-benzenedithiol, 1,2-benzenedimethanethiol, 1,3-benzenedimethanethiol, benzene-1,2-dithiol, benzene-1,3,-dithiol, poly(ethylene glycol)dithiol, poly(propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethyleneglycol bis(3-mercaptopropionate), and ethylene glycol bismercaptoacetate. Monomers based on short aliphatic chains ($C_1$-$C_6$), those possessing hydroxyl (OH), ethylene glycol/oxide (EO), or propylene glycol/oxide (PO) functionality, or combinations thereof, such as 2,2'-thiodiethanethiol, 2,3-dimercapto-1-propanol, poly(ethylene glycol)dithiol, poly(propylene glycol) dithiol, hexa(ethylene glycol) dithiol, tetra(ethylene glycol) dithiol, 2,2'-(Ethylenedioxy)diethanethiol, 1,4-dithioerythritol, L-dithiothreitol, D-dithiothreitol, ethyleneglycol bis(3-mercaptopropionate), and ethylene glycol bismercaptoacetate are more water-soluble, and may thus be more preferred in accordance with certain embodiments of the invention.

In example Reaction Scheme (2), in accordance with certain embodiments of the invention, 'R$^2$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that monomer is substantially water-soluble. Non-limiting examples of monomers that satisfy this definition include but are not limited to the following: 1,2,4-trivinylcyclohexane, diallylmaleate. 3,9-divinyl-2,4,8,10-tetraoxaspiro[5.5]undecane, 1,3,5-triallyl-1,3,5-triazine-2,4,6(1H,3H,5H)-trione, 2,4,6-triallyloxy-1,3,5-triazine, pentaerythritol allyl ether, pentaerythritol triallyl ether, trimethylolpropane allyl ether, glyoxal bis(diallyl ether), trimethylolpropane tri(meth)acrylate, pentaerythritol tri(meth)acrylate, trimethylolpropane ethoxylate tri(meth)acrylate, trimethylolpropane tri(meth)acrylate, glycerol propoxylate (1PO/OH) tri(meth)acrylate, trimethylolpropane propoxylate tri(meth)acrylate, pentaerythritol tetra(meth)acrylate, di(trimethylolpropane) tetra(meth)acrylate. Monomers based on short aliphatic chains ($C_1$-$C_6$), those possessing hydroxyl (OH), ethylene glycol/oxide (EO), or propylene glycol/oxide (PO) functionality, or combinations thereof, such as diallylmaleate. 3,9-divinyl-2,4,8,10-tetraoxaspiro[5.5]undecane, 1,3,5-triallyl-1,3,5-triazine-2,4,6(1H,3H,5H)-trione, 2,4,6-triallyloxy-1,3,5-triazine, pentaerythritol allyl ether, pentaerythritol triallyl ether, trimethylolpropane allyl ether, glyoxal bis(diallyl ether), trimethylolpropane tri(meth)acrylate, pentaerythritol tri(meth)acrylate, trimethylolpropane ethoxylate tri(meth)acrylate, trimethylolpropane tri(meth)acrylate, glycerol propoxylate (1PO/OH) tri(meth)acrylate, trimethylolpropane propoxylate tri(meth)acrylate, pentaerythritol tetra(meth)acrylate, di(trimethylolpropane) tetra(meth)acrylate are more water-soluble, and are thus more preferred In example Reaction Scheme (2), in accordance with certain embodiments of the invention, 'R$^3$' may comprise a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that the monomer is substantially water-soluble. Non-limiting examples of monomers that satisfy this definition include but are not limited to the following: trimethylolpropane tris(3-mercaptopropionate), trimethylolpropane tris (mercaptoacetate), pentaerythritol tris(3-mercaptoprionate), 2-hydroxymethyl-2-methyl-1,3-propanediol tris(3-mercaptopropionate), pentaerythritol tris(mercaptoacetate), tris[2-(3-mercaptopropionyloxyethyl]isocyanurate, 4 arm poly (ethylene glycol) tetrathiol, pentaerythritol tetrakis(3-mercaptopropionate), pentaerythritol tetrakis (mercaptoacetate), and dipentaerythritol hexa(3-mercaptopropionate).

In example Reaction Scheme (2), coefficients 'X', 'Y', and 'Z' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the moles of the monomer having three reactive thiol groups). For simplicity, the sum of 'X', 'Y', and 'Z' may be a value of 1.0 (e.g., accounts for 100% of the monomer content). In accordance with certain embodiments of the invention, the coefficient 'X' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Z' may be independently selected from 0.01 to 0.95 (e.g., 1% to 95% of the total moles or total weight of the monomers in the reactant system), such as at most about any of the following: 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.05, 0.1, 0.15, 0.2, 0.25, 0.3, 0.35, 0.4, 0.45, 0.5, 0.55, 0.6, 0.65, 0.7, 0.75. For example only, reactant mixtures including equal amounts (e.g., in moles or % weight) of the three monomers in reaction scheme (1) would comprise coefficient values for each of 'X', 'Y', and 'Z' of ⅓ (i.e., X=⅓; Y=⅓; and Z=⅓). In accordance with certain embodiments of the invention, for example, 'Y' may comprise from about 0.01 to about 0.35 (e.g., 1-35% by weight of the total monomer weight), such as from about 0.02 to about 0.20 (e.g., 2-20% by weight of the total monomer weight) or from about 0.05 to about 0.15 (e.g., 5-15% by weight of the total monomer weight).

In example Reaction Scheme (2), in accordance with certain example embodiments of the invention, the weight percent of the 'X' monomer (e.g., includes $R^1$) may be varied such that the total moles of thiol functionality (e.g., in the 'X' monomer+those in the 'Z' monomer if used) are approximately equal to the moles of vinyl functionality in the 'Y' monomer.

In accordance with certain embodiments of the invention, the total combination or sum of all of the monomers prior to, during, and/or after being radically-cured may comprise from about 10 to about 75 wt. % of the total composition (e.g., aqueous composition prior to being radically-cured or the cured GPE-composition), such as at most about any of the following: 75, 70, 65, 60, 55, 50, 45, 40, 35, 30, and 25 wt. % of the total composition (e.g., aqueous composition prior to being radically-cured or the cured GPE-composition) and/or at least about any of the following: 10, 12, 15, 20, 25, 30, 35, 40, 45, 50, and 55 wt. % of the total composition (e.g., aqueous composition prior to being radically-cured or the cured GPE-composition). For example, the total monomer content may comprise from about 10% to about 50% by weight of the GPE-composition (e.g., from about 15% to about 35% by weight of the GPE-composition, from about 15% to about 30% by weight of the GPE-composition, etc.).

In accordance with certain embodiments of the invention, the GPE-compositions (e.g., pre-cured composition) comprising the combination of monomers may also comprise a free radical initiator (e.g., chemical initiator, thermal initiator, photo-initiator, or redox initiation system), in which the free radical initiator may be present from about 0.25 to about 10 wt. % of the total monomer mass in the composition prior to being radically-cured. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the GPE-composition may comprise less than 10% by weight, such less than 5% by weight, or less than 1% by weight of an organic solvent. In accordance with certain embodiments of the invention, the GPE-composition may be devoid of an organic solvent.

In accordance with certain embodiments of the invention, the GPE-composition (e.g., pre-cured composition) may comprise a monomeric mixture or combination of monomers that may also comprise one or more electrolytes, such as alkali metal salts. In accordance with certain embodiments of the invention, the one or more electrolytes may include a compound capable of generating an ion on being dissolved in a solvent (e.g., an aqueous solvent) including lithium salts such as lithium hexafluorophosphate ($LiPF_6$), lithium tetrafluoroborate ($LiBF_4$), lithium hexafluoroarsenate ($LiAsF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$), lithium bis (perfluoroethanesulfonyl)imide ($LiN(SO_2C_2F_5)_2$), tris (trifluoromethanesulfonyl)methyllithium ($LiC(SO_2CF_3)_3$), tris(perfluoroethanesulfonyl)methyllithium ($LiC(SO_2C_2F_5)_3$), lithium tetrachloroaluminate ($LiAlCl_4$), lithium hexafluorosilicate ($Li_2SiF_6$), and lithium dicyanamide ($LiC_2N_3$). Additionally or alternatively to lithium salts, the electrolyte(s) may be selected from sodium salts, magnesium salts, zinc salts, and calcium salts. In accordance with certain embodiments of the invention, the one or more electrolytes may comprise lithium bis(trifluoromethanesulfonyl)imide (LiTFSI), lithium trifluoromethanesulfonate (LiOTf), lithium chloride (LiCl), lithium perchlorate (Li- ClO$_4$), lithium bromide (LiBr), lithium iodide (LiI), lithium thiocyanate (LiSCN), lithium tetrafluoroborate (LiBF$_4$), lithium hexafluoroarsenate (LiAsF$_6$), lithium bis(oxalate) borate (liBOB), lithium difluoro(oxalate)borate (LiDFOB), LiFAP [LiPF$_3$(CF$_2$CF$_3$)$_3$], lithium hexafluorophosphate (LiPF$_6$), a lithium polysulfide, zinc trifluoromethane-sulfonate (Zn(OTf)$_2$), di[bis(trifluoromethanesulfonyl) imide) (Zn(TFSI)$_2$), or combinations thereof. In accordance with certain embodiments of the invention, the one or more electrolytes may be dispersed and/or dissolved in water and be present in a concentration from about 1 molal (i.e., molality being the moles of solute per kg of solvent) to about 30 molal based on the water in the composition, such as at most about any of the following: 30, 28, 26, 24, 22, 20, 18, 16, 14, 12, 10, and 8 molal based on the water in the composition and/or at least about any of the following: 1, 2, 3, 4, 5, 6, 7, 8, 9, 10, 12, 14, 16, 18, and 20 molal based on the water in the composition. For example, the one or more electrolytes may be dispersed and/or dissolved in water and be present in a concentration from about 4 to about 30 molal based on the water in the composition, such as from about 20 to about 30 molal based on the water in the composition. In accordance with certain embodiments of the invention, the one or more electrolytes may be dispersed and/or dissolved in water and/or the monomeric mixture forming the GPE-composition (e.g., pre-cured composition) or the cured GPE and be present from about 20 wt. % to about 90 wt. % (e.g., the monomeric mixture, water, and electrolytes), such as at most about any of the following: 90, 85, 80, 75, 70, 65, 60, 55, and 50 wt. % of the GPE-composition (e.g., the monomeric mixture, water, and electrolytes) or the cured GPE and/or at least about any of the following: 20, 25, 30, 35, 40, 45, and 50 wt. % of the GPE-composition (e.g., the monomeric mixture, water, and electrolytes) of the cured GPE. In accordance with certain embodiments of the invention, the GPE-compositions may have a conductivity from about 104 to about $10^{-3}$ S/cm.

In accordance with certain embodiments of the invention, the GPE-composition (e.g., pre-cured composition) may comprise the combination of monomers, one or more electrolytes, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, dried cathode slurries, dried anode slurries, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

As noted above, the GPE-compositions may comprise a three-dimensionally cross-linkable combination of monomers that upon curing form a network in the form of a hydrogel that retains an electrolyte solution. The three-dimensional polymer network may be formed or defined by a reaction product of a variety of substantially water soluble monomers. In accordance with certain embodiments of the invention, the chemistry for forming the GPE-compositions may be based upon the radically-mediated polymerization of appropriately functionalized thiol and olefinic monomers, and/or acrylate or methacrylate monomers in the presence of free-radical initiators, which can be cured into cross-linked three-dimensional networks when some or all of the monomers possess, for example, two or more thiol, olefinic, acrylate, or methacrylate functional groups. In accordance with certain embodiments of the invention, the acrylate or methacrylate-containing monomers may possess side-chain functionalities that impart substantial water-solubility to the monomers, and water-swellability to the resulting cross-linked three-dimensional polymeric networks (e.g., hydrogels) produced therefrom. In accordance with certain embodiments of the invention, the properties (e.g., physical/mechanical, chemical, and tackiness) of the final cross-linked three-dimensional networks can be selectively tuned by varying one or more of (i) the monomer structure(s) (e.g., acrylate/methacrylate backbone and side chain), (ii) the number of the acrylate or methacrylate functionalities of the cross-linking monomers, (iii) the relative monomer stoichiometry, (iv) the radical initiator level/concentration, and (v) the polymerization conditions (e.g., temperature, concentration, and presence of additives and impurities).

In accordance with certain embodiments of the invention, the radicals used to initiate the polymerization reaction may be generated, for example, under the influence of radiation, in which the resulting process may be referred to as photopolymerization, photo-initiated polymerization, or photo-mediated polymerization, and can be further tuned by the choice of the free radical initiator (e.g., photo-initiator), light exposure, and/or dose.

In accordance with certain embodiments of the invention, the GPE-compositions may comprise a three-dimensionally cross-linkable combination of monomers that form a cross-linked three-dimensional polymer network and an electrolyte composition comprising an electrolyte and water. In this regard, the resulting GPEs may comprise a cross-linked three-dimensional network in the form of a hydrogel that retains an electrolyte solution. The three-dimensional polymer network may be formed or defined by a reaction product of a variety of substantially water soluble monomers as noted above. In accordance with certain embodiments of the invention, the chemistry for forming the GPE compositions may be based upon the radically mediated reaction product of at least a first monomer including an acrylate or methacrylate functional groups and a second monomer or oligomer including at least two (2) free-radically polymerizable functional groups. For example, the at least two (2) free-radically polymerizable functional groups may independently from each other comprise an acrylate or methacrylate group, an allylic group, an alkynyl, a vinyl nitrile, a vinyl ether, a vinyl ester, a vinyl amide, a styrenic group, a maleate group, a fumarate group, or a norbornene group. In accordance with certain embodiments of the invention, in which the cross-linked three-dimensional polymer network comprises the reaction product of at least a first monomer including an acrylate or methacrylate functional group and a second monomer or oligomer including at least two (2) free-radically polymerizable functional groups, these monomers may be free of thiols. In accordance with certain embodiments of the invention, at least one of the first or second acrylate or methacrylate-containing monomer may comprise polyethylene glycol functionality (e.g., —O(C$_2$H$_4$O)$_n$H; where n has a value from 1 to 100), polypropylene glycol functionality (e.g., —O(C$_3$H$_6$O)$_n$H; where n has a value from 1 to 100, and/or glycerol functionality incorporated into the backbone of the monomer and/or grafted onto the monomer as a side-chain or a component of a side chain.

In accordance with certain embodiments of the invention, example Reaction Scheme (3) below illustrates the combination of monomers (i.e., 'W'-monomer, 'X'-monomer, 'Y'-monomer, and optional 'Z'-monomer) cured in an aqueous medium including a alkali, alkaline earth metal, or zinc salt to provide a cross-linked three-dimensional polymeric network:

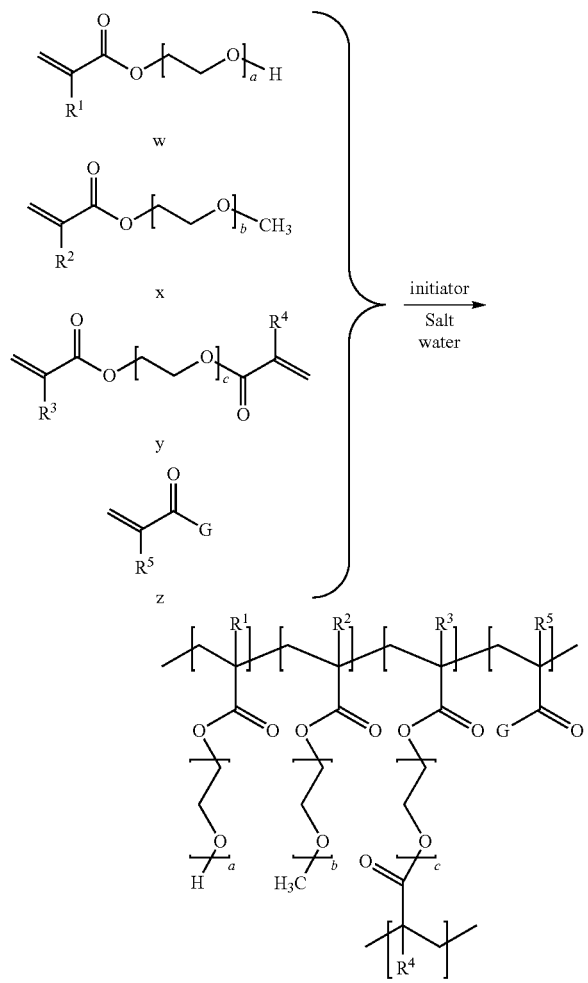

In example Reaction Scheme (3), in accordance with certain embodiments of the invention, '$R^1$' may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms and/or heteroatoms selected from oxygen, nitrogen, sulfur, phosphorus, or combinations thereof, such that monomer is substantially water-soluble. Non-limiting examples of monomers that satisfy this definition include but are not limited to hydroxyl-terminated acrylates and methacrylates such as the following: poly (ethylene glycol)(meth)acrylate, 2-hydroxyethyl (meth) acrylate, hydroxypropyl (meth)acrylate, 4-hydroxybutyl (meth)acrylate, poly(propylene glycol)(meth)acrylate, glycerol(meth)acrylate.

In example Reaction Scheme (3), in accordance with certain embodiments of the invention, '$R^2$' may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to alkoxy-terminated acrylates and methacrylates such as the following: poly (ethylene glycol) methyl ether(meth)acrylate, ethylene glycol methyl ether(meth)acrylate, di(ethylene glycol) methyl ether(meth)acylate, di(ethylene glycol) ethyl ether(meth) acrylate, ethylene glycol phenyl ether(meth)acrylate, tri(ethylene glycol) methyl ether (meth)acrylate, diethylene glycol butyl ether (meth)acrylate.

In example Reaction Scheme (3), in accordance with certain embodiments of the invention, '$R^3$' and '$R^4$' may independently from each other comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to all di-, tri-, and tetra-functional acrylates and methacrylates such as the following: 2-methacryloyloxyethyl acrylate (ethylene glycol acrylate methacrylate), 1,3-butanediol di(meth)acrylate, 1,4-butanediol di(meth)acrylate, 1,6,-hexane di(meth)acrylate, bisphenol A ethoxylate di(methacrylate), poly(ethylene glycol) di(meth) acrylate, ethylene glycol di(meth)acrylate, glycerol 1,3-diglycerolate di(meth)acrylate, di(ethylene glycol) di(meth) acrylate, neopentyl glycol di(meth)acrylate, tetra(ethylene glycol) di(meth)acrylate, poly(propylene glycol) di(meth) acrylate, tri(ethylene glycol) di(meth)acrylate, tri(propylene glycol) di(meth)acrylate, bisphenol A glycerolate (glycerol/phenol) di(meth)acrylate, 1,6,-hexanediol ethoxylate diacrylate, bisphenol F (2 EO/phenol), neopentyl glycol propoxylate (1 PO/OH) di(meth)acrylate, and trimethylolpropane ethoxylate (1PO/OH) methyl ether di(meth)acrylate, trimethylolpropane tri(meth)acrylate, pentaerythritol tri(meth) acrylate, trimethylolpropane ethoxylate tri(meth)acrylate, trimethylolpropane tri(meth)acrylate, glycerol propoxylate (1PO/OH) tri(meth)acrylate, trimethylolpropane propoxylate tri(meth)acrylate, pentaerythritol tetra(meth)acrylate, di(trimethylolpropane) tetra(meth)acrylate.

In example Reaction Scheme (3), in accordance with certain embodiments of the invention, 'R' (when the optional 'Z'-monomer is used) may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to the following: ethyl (meth)acrylate, (meth)acrylic acid, (meth)acrylic acid (lithium, sodium, and potassium salts), methyl 2-hydroxymethyl (meth)acrylate, ethyl 2-hydroxymethyl (meth)acrylate, furfuryl (meth)acrylate, tetrahydrofurfuryl (meth)acrylate, methyl trans-3-methoxyacrylate, ethyl 3,3-dimethylacrylate, isopropyl (meth)acrylate, 2-carboxyethyl (meth)acrylate, 2-ethoxyethyl (meth)acrylate, 2-(dimethylamino)ethyl (meth)acrylate, 3-(dimethylamino)propyl (meth)acrylate, 3-sulfopropyl (meth)acrylate (lithium, sodium, and potassium salts), acrylamide, N-isopropylacrylamide, N,N-dimethylacrylamide, N-hydroxymethyl acrylamide, itaconic acid, maleic acid, and fumaric acid.

In example Reaction Scheme (3), in accordance with certain embodiments of the invention, 'G'(when the optional 'Z'-monomer is used) may comprise a hydrogen atom, a hydrocarbon, an alcohol or polyol (e.g., having 1, 2, 3, 4, 5, 6, 7, 8, 9, or 10 carbon atoms), an acrylate-containing group, a methacrylate-containing group, an amine, a linear, branched, or (hetero)cyclic radical that may be saturated or unsaturated and having from about 1 to about 100 carbon atoms, and/or heteroatoms selected from oxygen, nitrogen, sulfur, phosphorus, or combinations thereof, such that monomer is substantially water-soluble. Non-limiting examples of monomers that satisfy this definition include but are not limited to the following: ethyl (meth)acrylate, (meth)acrylic acid, (meth)acrylic acid (lithium, sodium, and potassium salts), methyl 2-hydroxymethyl (meth)acrylate, ethyl 2-hydroxymethyl (meth)acrylate, furfuryl (meth)acrylate, tetrahydrofurfuryl (meth)acrylate, methyl trans-3-methoxyacrylate, ethyl 3,3-dimethylacrylate, isopropyl (meth)acrylate, 2-carboxyethyl (meth)acrylate, 2-ethoxyethyl (meth)acrylate, 2-(dimethylamino)ethyl (meth)acrylate, 3-(dimethylamino)propyl (meth)acrylate, 3-sulfopropyl (meth)acrylate (lithium, sodium, and potassium salts), acrylamide, N-isopropylacrylamide, N,N-dimethylacrylamide, N-hydroxymethyl acrylamide, itaconic acid, maleic acid, and fumaric acid.

In example Reaction Scheme (3), coefficients 'W', 'X', and 'Y' may represent, in accordance with certain embodiments of the invention, (i) the relative number of moles of each respective monomer with respect to the total number of moles of all monomers in the reactant system or (ii) the relative weight % of each respective monomer with respect to the total weight of all of the monomers in the reactant system. In this regard, the relative amount of moles of each monomer may vary independently in accordance with certain embodiments of the invention to provide and/or manipulate the particular structure of the resulting cross-linked three-dimensional polymeric network (e.g., more or less cross-linking may be desired by varying the multi-acrylate-containing monomer). For simplicity, the sum of 'W', 'X', and 'Y' may be a value of 1.0 (e.g., 100%). In accordance with certain embodiments of the invention, the coefficient 'W' may be independently selected from 0.01 to 0.99 (e.g., 1% to 99% of the total moles or total weight of the monomers in the reactant system), such as at most about any of the following: 0.99, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'X' may be independently selected from 0.01 to 0.99 (e.g., 1% to 99% of the total moles or total weight of the monomers in the reactant system), such as at most about any of the following: 0.99, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Y' may be independently selected from 0.01 to 1.0 (e.g., 1% to 100% of the total moles or total weight of the monomers in the reactant system), such as at most about any of the following: 1.0, 0.95, 0.9, 0.85, 0.8, 0.75, 0.7, 0.65, 0.6, 0.55, 0.5, 0.45, 0.4, 0.35, 0.30, 0.25, 0.20, 0.15, and 0.1 and/or at least about any of the following: 0.01, 0.02, 0.03, 0.04, 0.05, 0.1, 0.15, 0.2, 0.25, 0.3, 0.35, 0.4, 0.45, 0.5, 0.55, 0.6, 0.65, 0.7, 0.75. In accordance with certain embodiments of the invention, the coefficient 'Z' may be independently selected from 0.0 to 0.25 (e.g., 0% to 25% of the total moles or total weight of the monomers in the reactant system), such as at most about any of the following: 0.25, 0.20, 0.15, and 0.1 and/or at least about any of the following: 0.0, 0.01, 0.02, 0.03, 0.04, 0.05, 0.1, 0.15, and 0.2. For example only, reactant mixtures including equal amounts (e.g., in moles or % weight) of the three monomers in reaction scheme (3) (excluding optional 'Z'-monomer) would comprise coefficient values for each of 'W', 'X', and 'Y' of ⅓ (i.e., W=⅓; X=⅓; and Y=⅓).

In example Reaction Scheme (3), 'a', 'b', and 'c' may have a values from 1 to 100 (e.g., 1, 2, 3, 4, 5, 6, 7, 8, 9, 10, etc.). In accordance with certain embodiments of the invention, 'a', 'b', and 'c' may independently have a value, for example, of at most about any of the following: 100, 95, 90, 85, 80, 75, 70, 65, 60, 55, 50, 45, 40, 35, 30, 25, and 20 and/or at least about any of the following: 1, 3, 5, 8, 10, 15, 20, 25, 30, 35, 40, 45, and 50. Although each of the repeat units in the backbones of the three monomers in example reaction scheme (3) have a polyethylene glycol radical, the repeating unit of each monomer may independently comprise other water solubility-imparting groups as noted previously.

In accordance with certain embodiments of the invention, the total combination or sum of all of the monomers in acrylate-based embodiments prior to, during, and/or after being radically-cured may comprise from about 10 to about 50 wt. % of the total composition (e.g., aqueous composition prior to being radically-cured or the cured GPE), such as at most about any of the following: 50, 45, 40, 35, 30, 25, 20, and 15 wt. % of the total composition (e.g., aqueous composition prior to being radically-cured or the cured GPE) and/or at least about any of the following: 10, 12, 15, 20, 25, and 30 wt. % of the total composition (e.g., aqueous composition prior to being radically-cured or the cured GPE).

In accordance with certain embodiments of the invention, the GPE-composition (e.g., pre-cured composition) comprising a combination of monomers in acrylate-based embodiments may also comprise a free radical initiator (e.g., chemical initiator, thermal initiator, photo-initiator, or redox initiation system), in which the free radical initiator may be present from about 0.25 to about 10 wt. % of the total monomer mass in the composition prior to being radically-cured. In accordance with certain embodiments of the invention, the free radical initiator may be present from at most about any of the following: 10, 9, 8, 7, 6, 5, 4, 3, 2, and 1 wt. % of the total monomer mass in the composition prior to being radically-cured and/or at least about any of the following: 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the GPE-composition in acrylate-based embodiments may comprise less than 10% by weight, such less than 5% by weight, or less than 1% by weight of an organic solvent. In accordance with certain embodiments of the invention, the GPE-composition may be devoid of an organic solvent.

In accordance with certain embodiments of the invention, the GPE-composition and/or the GPE comprising the combination of monomers may also comprise one or more electrolytes, such as alkali metal salts. In accordance with certain embodiments of the invention, the one or more electrolytes may a compound capable of generating an ion on being dissolved in a solvent (e.g., an aqueous solvent) including lithium salts such as lithium hexafluorophosphate ($LiPF_6$), lithium tetrafluoroborate ($LiBF_4$), lithium hexafluoroarsenate ($LiAsF_6$), lithium bis(oxalate)borate (liBOB), lithium difluoro(oxalate)borate (LiDFOB), LiFAP [$LiPF_3$ $(CF_2CF_3)_3$], lithium hexafluoroarsenate ($LiAsF_6$), lithium perchlorate ($LiClO_4$), lithium trifluoromethanesulfonate ($CF_3SO_3Li$), lithium bis(trifluoromethanesulfonyl)imide ($LiN(SO_2CF_3)_2$), lithium bis(perfluoroethanesulfonyl)imide ($LiN(SO_2C_2F_5)_2$), tris(trifluoromethanesulfonyl)methyllithium ($LiC(SO_2CF_3)_3$), tris(perfluoroethanesulfonyl)methyllithium ($LiC(SO_2C_2F_5)_3$), lithium tetrachloroaluminate ($LiAlCl_4$), lithium hexafluorosilicate ($Li_2SiF_6$), and lithium dicyanamide ($LiC_2N3$). Additionally, or alternatively to lithium salts, the electrolyte(s) may be selected from sodium salts, magnesium salts, zinc salts, and calcium salts. In accordance with certain embodiments of the invention, the one or more electrolytes may comprise lithium bis(trifluoromethanesulfonyl)imide (LiTFSI), lithium trifluoromethanesulfonate (LiOTf), lithium chloride (LiCl), lithium hexafluorophosphate ($LiPF_6$), a lithium polysulfide, zinc bis(trifluoromethanesulfonate) ($Zn(OTf)_2$), $Zn(TFSI)_2$, or combinations thereof. In accordance with certain embodiments of the invention, the one or more electrolytes may be dispersed and/or dissolved in water and be present in a concentration from about 1 molal (i.e., molality being the moles of solute per kg of solvent) to about 30 molal based on the water in the composition, such as at most about any of the following: 30, 28, 26, 24, 22, 20, 18, 16, 14, 12, 10, and 8 molal based on the water in the composition and/or at least about any of the following: 1, 2, 3, 4, 5, 6, 7, 8, 9, 10, 12, 14, 16, 18, and 20 molal based on the water in the composition. For example, the one or more electrolytes may be dispersed and/or dissolved in water and be present in a concentration from about 4 to about 30 molal based on the water in the composition, such as from about 20 to about 30 molal based on the water in the composition. In accordance with certain embodiments of the invention, the one or more electrolytes may be dispersed and/or dissolved in water and/or the monomeric mixture forming the GPE-composition (e.g., pre-cured composition) or a cured GPE and be present from about 20 wt. % to about 90 wt. % (e.g., the monomeric mixture, water, and electrolytes), such as at most about any of the following: 90, 85, 80, 75, 70, 65, 60, 55, and 50 wt. % of the GPE-composition (e.g., the monomeric mixture, water, and electrolytes) or cured GPE and/or at least about any of the following: 20, 25, 30, 35, 40, 45, and 50 wt. % of the GPE-composition (e.g., the monomeric mixture, water, and electrolytes) or the cured GPE. In accordance with certain embodiments of the invention, the GPE-compositions and/or GPE may have a conductivity from about $10^1$ to about $10^{-3}$ S/cm.

In accordance with certain embodiments of the invention, the GPE-compositions (e.g., pre-cured composition) may comprise the combination of monomers (e.g., acrylate-based monomers), one or more electrolytes, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In accordance with certain embodiments of the invention, the GPE-composition may include a viscosity reducing agent. For instance, the viscosity reducing agent may be present in the GPE-composition sufficient to lower the viscosity and/or surface tension of the GPE-composition to facilitate penetration of the GPE-composition into the porous structure of an electrode prior to curing of the GPE-composition. For example, an electrode may comprise a porous structure having a plurality of pores extending from the surface of the electrode into the body of the electrode. In accordance with certain embodiments of the invention, the GPE-composition having a reduced viscosity and/or surface tension due to the presence of the viscosity reducing agent may be allowed or forced (e.g., applying a slight pressure or external force onto the GPE-composition to facilitate entry of the GPE-composition into the pores) into and fill at least a portion of the pores to provide a more conformal coating layer of the GPE-composition prior to undergoing a curing operation (e.g., UV-curing or thermal curing). In accordance with certain embodiments of the invention, the GPE-composition may be subjected to a curing operation (e.g., radically cured via UV or thermal processes) after the GPE-composition has filled and/or entered at least a portion of the pores of the electrode to provide a conformally coated GPE layer.

The viscosity reducing agent, in accordance with certain embodiments of the invention, may comprise an organic solvent. In accordance with certain embodiments of the invention, the organic solvent may comprise a polar protic solvent, a polar aprotic solvent, or combinations thereof. In accordance with certain embodiments of the invention, the organic solvent may be devoid of hydroxyl groups. The organic solvent, in accordance with certain embodiments of the invention, includes or is a polar aprotic solvent. In accordance with certain embodiments of the invention, for instance, the organic solvent comprises a polar solvent. For example, the organic solvent may have a dipole moment of at least about 3 D, at least about 4 D, or at least about 5 D. In accordance with certain embodiments of the invention, the organic solvent has a Polarity Index of at least about 4, at least about 5, at least about 6, or at least about 7. Non-limiting examples of such organic solvents suitable as viscosity reducing agents include cyclic carbonates, such as propylene carbonate, ethylene carbonate, or trimethylene carbonate. Additional examples of viscosity reducing agents include acetonitrile and tetrahydrofuran. In accordance with certain embodiments of the invention, the GPE-composition may comprise from about 1 wt. % to about 25 wt. % of the organic solvent, such as at least about any of the following: 1, 3, 5, 8, 10, 12, and 15 wt. % and/or at most about any of the following: 25, 22, 20, 18, 15, 12, and 10 wt. %. In accordance with certain embodiments of the invention, the GPE-composition including a viscosity reducing agent may also include a three-dimensionally cross-linkable monomeric mixture, such as those described and disclosed herein, and an electrolyte composition, such as those descried and disclosed herein. Additionally, the GPE-compositions including a viscosity reducing agent may be radically cured (e.g., UV-cured or thermally cured) to provide a GPE suitable for incorporation into an electrochemical cell.

In another aspect, embodiments of the present invention provide a GPE comprising a cross-linked three-dimensional polymer network comprising, for example, a reaction product of the three-dimensionally cross-linkable monomeric mixtures described and disclosed herein. The GPEs also include an electrolyte composition comprising at least one electrolyte and water. In accordance with certain embodiments of the invention, the GPE is provided in the form of a water-swellable hydrogel having a thickness from about 10 to 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In accordance with certain embodiments of the invention, the cross-linked three-dimensional polymer network comprises from about 10% to about 50% by weight of the GPE, such as at least about any of the following: 10, 12, 15, 18, and 20% by weight of the GPE and/or at most about any of the following: 50, 45, 40, 35, 30, 25, and 20% by weight of the GPE.

In accordance with certain embodiments of the invention, the GPE may further comprise a separator adhered to a surface thereof or embedded within the GPE. For example, the separator may comprise a variety of materials suitable for use in an electrochemical cell, such as cellulose, glass fibers, polyolefins, polyamides, polyethylene terephthalates, or any combinations thereof. The separator for example, may comprise a variety of forms, such as a mesh structure, a woven material, or a nonwoven material. In accordance with certain embodiments of the invention, the separator may be adhered to a surface of the GPE with the GPE at least partially penetrating into the openings or porous pathways of the separator without fully enveloping the separator. Such a configuration may be obtained, for example, by positioning the separator on a substrate, such as an electrode, and coating the separator with a GPE-composition followed by curing the GPE-composition to form a GPE including a separator located at a surface of the GPE. In accordance with certain embodiments of the invention, the GPE may include a separator that is fully embedded within the thickness of the GPE. For example, the separator may not be exposed to an ambient environment due to being fully encapsulated by the GPE Such a configuration may be obtained, for example, by positioning the separator within a mold and pouring a GPE-composition inside the mold to fully encapsulate the separator followed by curing the GPE-composition to form a GPE including a separator fully embedded therein.

In another aspect, embodiments of the present invention provide electrochemical cells including an anode, a cathode and a GPE positioned between and in contact with the anode and the cathode. In accordance with certain embodiments of the invention, the cathode may comprise the positive electrode and the anode may comprise the negative electrode, in which the cathode refers to the electrode where the reduction takes place during discharge and the anode refers to the electrode where oxidation takes place during discharge. The GPE, in accordance with certain embodiments of the invention, may comprise a single layer or multiple layers and still be considered to be in contact with both the anode and cathode. In accordance with certain embodiments of the invention, the GPE includes (a) a cross-linked three-dimensional polymer network, such as those described and disclosed herein, and (b) an electrolyte composition absorbed by the GPE. In accordance with certain embodiments of the invention, the electrolyte composition may comprise at least one electrolyte and water, in which the GPE has weight percentage of salt from about 40% to about 90% (e.g., 40-90 wt. % of salt), such as at least about any of the following: 40, 45, 50, 55, 60, 65, and 70 wt. % of salt and/or at most about any of the following: 90, 85, 80, 75, 70, 65, 60, and 55 wt. % of salt.

In accordance with certain embodiments of the invention, the GPE may comprise any GPE-composition as described and disclosed herein. In accordance with certain embodiments of the invention, the electrochemical cells may be provided in a variety of different shapes and forms and may comprise primary and secondary electrochemical cells. For instance, electrochemical cells in accordance with certain embodiments of the invention may comprise a rigid or non-rigid configuration. Non-rigid configurations, for example, may comprise an electrochemical cell that may be flexible such that the electrochemical cell's shape or configuration may be adjustable (e.g., movable between linear/flat configuration to an arcuate configuration) prior to or during operation. In accordance with certain embodiments of the invention, the electrochemical cells (e.g., aqueous electrochemical cells) may include one or more electrode (e.g., anode and/or cathode) including a gel polymer electrolyte or derivative thereof as a component (e.g., as a binder) forming the electrode.

In accordance with certain embodiments of the invention, the electrochemical cells may comprise an operational voltage window from about 1 to about 6 volts, such as at most about any of the following: 6, 5.5, 5, 4.5, 4, 3.5, 3, and 2.5 volts and/or at least about any of the following: 1, 1.25, 1.5, 1.75, 2, 2.25, 2.5, 2.75, 3, 3.25, 3.5, 3.75, and 4 volts.

In accordance with certain embodiments of the invention, the electrochemical cells may comprise an initial discharge capacity for an initial cycle and a second discharge capacity for a 10th cycle, wherein a capacity reduction from the initial cycle to the 10th cycle is less than about 20%, such as less than about 18%, 15%, 12%, 10%, 8%, 6%, 4%, 2%, or 1%.

In accordance with certain embodiments of the invention, the anode of the electrochemical cell may comprise an anode-composition comprising (a) an active anode species and (b) optionally a cured GPE-composition, in which the active anode species and the cured GPE-composition are admixed together. For example, the cured GPE-composition, which may be tacky, may be used by replacing traditional electrode binders such as styrene-butadiene rubber (SBR) and polyvinylidene fluoride (PVDF) based binders. In this regard, anodes in accordance with certain embodiments of the invention may be devoid on an SBR and/or PVDF. Additionally or alternatively, the anode-composition may include traditional electrode binders, such as styrene-butadiene rubber (SBR) and polyvinylidene fluoride (PVDF) based binders. For example, the GPE-composition (e.g., pre-cured composition) may penetrate the pores of the porous electrode, which may be held together by traditional electrode binders. Additionally or alternatively, the cathode of the electrochemical cell may comprise a cathode-composition comprising (a) an active cathode species and (b) a cured GPE-composition; wherein the active cathode species and the cured GPE-composition are admixed together. For example, the cured GPE-composition, which may be tacky, may be used by replacing traditional electrode binders such as styrene-butadiene rubber (SBR) and polyvinylidene fluoride (PVDF) based binders. In this regard, cathodes in accordance with certain embodiments of the invention may be devoid on an SBR and/or PVDF. Additionally or alternatively, the anode-composition may include traditional electrode binders, such as styrene-butadiene rubber (SBR) and polyvinylidene fluoride (PVDF) based binders. For example, the GPE-composition (e.g., pre-cured composition) may penetrate the pores of the porous electrode, which may be held together by traditional electrode binders.

In accordance with certain embodiments of the invention, the cathode and/or the anode may comprise at least one active surface that comprises a surface of an electrode that is in physical contact with the GPE and at which electrochemical reactions may take place. For example, cathode may include cathode active surface and/or the anode can include anode active surface. In accordance with embodiments of the invention, in which the anode and/or cathode include a cured GPE-composition or derivative thereof incorporated therein (e.g., as a binder for the active species), the active surface may not be a simple planar interface but the active surface or interface may effectively penetrate into the respective electrode by virtue of utilizing the pre-cured GPE-composition or derivative thereof into the electrode followed by curing. In this regard, the interface area (e.g., surface area) between the GPE and the electrodes may effectively be greatly increased per a given exterior surface area or volume of the electrodes. Additionally or alternatively, the anode and/or cathode may be formed and/or held together with traditional electrode binders, such as styrene-butadiene rubber (SBR) and polyvinylidene fluoride (PVDF) based binders, and the GPE-composition (e.g., pre-cured composition) may penetrate the pores of the porous electrode, which may be held together by traditional electrode binders. In accordance with certain embodiments of the invention, the active surface may not be a planar interface. For example, the active surface or interface may effectively penetrate into the respective electrode by virtue of the penetration of the GPE-composition (pre-cured) into the electrode followed by radically curing the GPE-composition to form a cross-linked GPE having an irregular interface with the electrode(s) (e.g., an conformal interface). In this regard, the interface area (e.g., surface area) between the GPE and the electrodes may effectively be greatly increased per a given exterior surface area or volume of the electrodes.

As used herein, the term "anode active species" may comprise any electrochemically active species associated with the anode. For example, the anode may comprise graphite, lithium, zinc, silicon, tin oxides, antimony oxides, or a lithium-containing material, such as lithium titanium oxide. In accordance with certain embodiments of the invention, the anode active species may comprise lithium metal or a lithium alloy. As used herein, the term "cathode active species" may comprise any electrochemically active species associated with the cathode. For example, the cathode may comprise a lithium metal oxide (e.g., a lithium-doped cobalt oxide, lithium-doped nickel oxide, a lithium-doped manganese oxide, etc.), or a sulfur-containing material (e.g., elemental sulfur).

Figure 2:
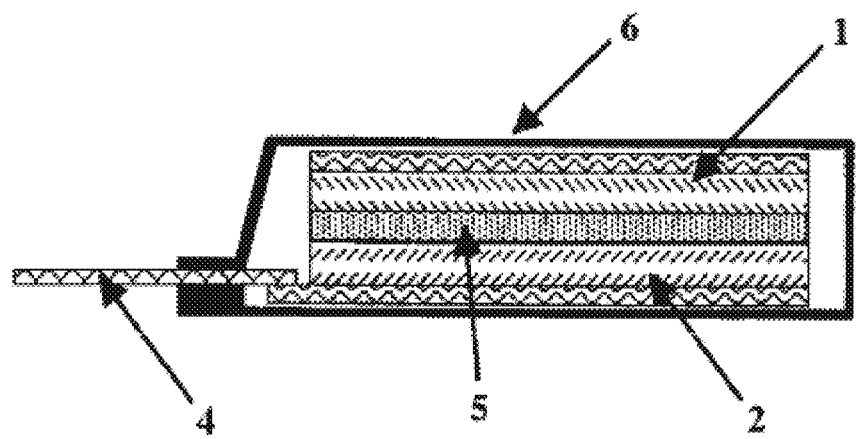
FIG. 2 illustrates a cross-sectional view of the electrochemical cell of FIG. 1.

FIG. 1 illustrates an exterior of an electrochemical cell 10 according to certain embodiments of the invention. As shown in FIG. 1, the electrochemical cell 10 may comprise battery container or housing 6, a cathode lead terminal 3 and an anode lead terminal 4. FIG. 2 illustrates a cross-sectional view of the electrochemical cell 10 of FIG. 1. As shown in FIG. 2, the electrochemical cell comprises a cathode 1, an anode 2, and a GPE 5 that is disposed between and in contact with the cathode 1 and anode 2.

In another aspect, embodiments of the present invention provide methods of forming a GPE. Such methods, for instance, may include radically-curing a GPE-composition (e.g., a pre-cured aqueous GPE-composition or pre-cured GPE-composition including a viscosity reducing agent) including a mixture of monomers. In this regard, the GPE-composition may comprise the mixture of monomers and an electrolyte suspended or dissolved in water and/or within the monomeric components of the mixture of monomers. In accordance with certain embodiments of the invention, for example, the quantity or amount of the electrolyte may be significantly increased by utilizing the solubility of the electrolyte within the mixture of monomers in the GPE-composition. For example, the method may comprise adding the electrolyte directly into the mixture of monomers such that the resulting concentration in the GPE-composition exceeds the saturation concentration of the electrolyte in water. In accordance with certain embodiments of the invention, the resulting GPE-composition may be considered to be a "super concentrated" GPE-composition.

In accordance with certain embodiments of the invention, the method may comprise providing a GPE-composition (e.g., a pre-cured composition) comprising a three-dimensionally cross-linkable monomeric mixture, at least one electrolyte (e.g., at least one salt), and water, in which the GPE-composition has a weight percentage of salt from about 40% to about 90% (e.g., 40-90 wt. % of salt), such as at least about any of the following: 40, 45, 50, 55, 60, 65, and 70 wt. % of salt and/or at most about any of the following: 90, 85, 80, 75, 70, 65, 60, and 55 wt. % of salt. The method may also comprise radically-curing the pre-cured composition, such as by a UV-curing operation or a thermal-curing operation. For instance, the GPE-composition may include a thermal initiator to facilitate thermal curing of the GPE-composition to form a GPE suitable for use in an electrochemical cell.

Figure 3:
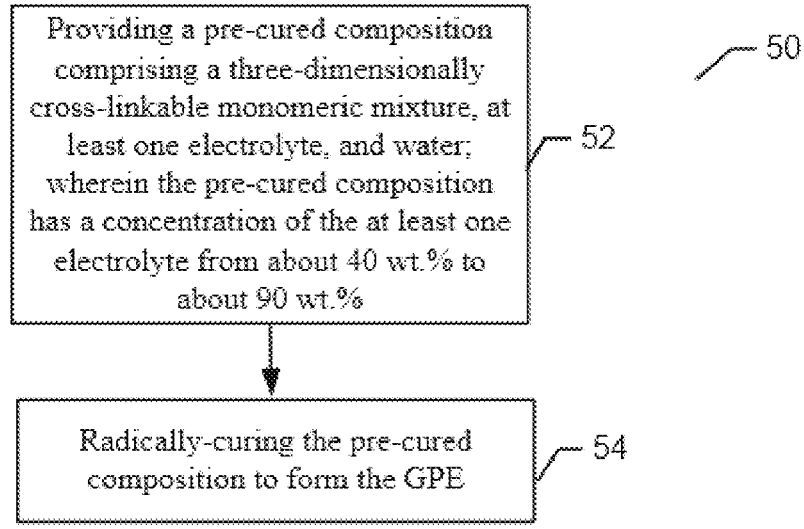
FIG. 3 illustrates a block diagram of a method for forming a GPE in accordance with certain embodiments of the invention.

FIG. 3, for example, illustrates a method 50 for forming a GPE in accordance with certain embodiments of the invention that may include providing a pre-cured composition comprising a three-dimensionally cross-linkable monomeric mixture, at least one electrolyte, and water, in which the pre-cured composition has a concentration of the at least one electrolyte from about 40 wt. % to about 90 wt. %, at operation 52. The method 50 for forming a GPE may also include radically-curing the pre-cured composition to form the GPE at operation 54.

In accordance with certain embodiments of the invention, the step of radically-curing the GPE-composition may not be particularly limited as long as radicals are generated to promote curing or reaction (e.g. polymerization reaction) of the monomers in the GPE-composition. For instance, radically-curing the GPE-composition may include a photo-initiated process (e.g., visible light, UV, or electron beam cure), chemically and/or thermally-initiated processes. For instance the GPE-composition may include at least one thermal initiator. The thermal initiator, for example, may comprise a self-accelerating decomposition from about 40° C. to about 120° C., such as at least about any of the following: 40, 50, 60, 70, and 80° C. and/or at most about any of the following: 120, 110, 110, 100, 90, and 80° C. In accordance with certain embodiments of the invention, the thermal initiator may be selected that has a decomposition rate that is sufficiently high enough at useful temperatures.

In accordance with certain embodiments of the invention, the decomposition rate $K_d$ (s$^{-1}$) of the thermal initiator may comprise a value exceeding about $1.0 \times 10^{-5}$ at 100° C., or exceeding about $1.0 \times 10^{-4}$ at 100° C., or exceeding about $1.0 \times 10^{-3}$ at 100° C. It should be noted that $K_d$ values of thermal initiators will decrease as the temperature is decreased. Accordingly, thermal initiators having $K_d$ values less than or at $1 \times 10^{-5}$ at 100° C. may not be desirable in accordance with certain embodiments of the invention. Table 3, provided below, lists decomposition data for selected initiators in benzene. All data in Table 3 is taken from "Polymer Handbook", Eds. Brandrup, J; Immergut, E. H.; Grulke, E. A., 4th Edition, John Wiley, New York, 1999. Thermal initiators in bold font represent a few example thermal initiators that may be preferred in accordance with certain embodiments of the invention.

TABLE 3

Decomposition data for selected initiators in benzene

| Initiator | Temp (° C.) | $K_d$ (s$^{-1}$) |
|---|---|---|
| 2,2'-Azobisisobutyronitrile (AIBN) | 100 | $1.5 \times 10^{-3}$ |
| Benzoyl peroxide (BPO) | 100 | $5.0 \times 10^{-4}$ |
| 1,1-Bis(tert-butylperoxy)cyclohexane | 93 | $1.9 \times 10^{-5}$ |
| 2,5-Bis(tert-butylperoxy)-2,5-dimethylhexane | 115 | $1.1 \times 10^{-5}$ |
| tert-Butyl hydroperoxide | 130 | $3.0 \times 10^{-7}$ |
| tert-Butylperacetate | 100 | $1.5 \times 10^{-5}$ |
| tert-Butylperoxide | 100 | $8.8 \times 10^{-7}$ |
| tert-Butyl peroxybenzoate | 100 | $1.1 \times 10^{-5}$ |
| Cumene hydroperoxide | 115 | $4.0 \times 10^{-7}$ |
| bury peroxide (LPO) | 85 | $3.8 \times 10^{-4}$ |

In accordance with certain embodiments of the invention, the thermal initiator may be present in the GPE-composition from about 0.5-5% by weight of the GPE-composition, such as at least about any of the following: 0.5, 0.6, 0.8, 1, 1.5, 2, 2.5, and 3% by weight of the GPE-composition and/or at most about any of the following: 5, 4.5, 4, 3.5, and 3% by weight of the GPE-composition.

In accordance with certain embodiments of the invention, the GPE-composition is devoid of an azo-based thermal initiator. The thermal initiator may comprise at least an organic peroxide or at least a peroxy ester. In accordance with certain embodiments of the invention, the thermal initiator may comprise any compound capable of producing radicals in response to temperature changes. Examples of classes of such compounds that exhibit this characteristic may include: diacyl peroxides, peroxyesters, peroxydicarbonates, dialkyl peroxides, ketone peroxides, peroxyketals, hydroperoxides, hydrogen peroxide, azo nitriles, azo esters, azo amides, azo imidazolines, azo amidines, and macromolecular azo compounds. Non-limiting examples of these compounds are dilauryl peroxide, dibenzoyl peroxide (BPO), tert-butyl perbenzoate, tert-butyl peroxyacetate, 2,4-pentanedione peroxide, methyl ethyl ketone peroxide, cumene hydroperoxide, tert-amyl peroxy-2-ethylhexyl carbonate, tert-buty peroxy isopropyl carbonate, di-tert-butyl peroxide, tert-amyl peroxybenzoate, di-tert-amyl peroxide, 2,5-dimethyl 2,5-di-(tert-butyl-peroxy)hexyne, 2,5-dimethyl 2,5-di-(tert-butyl-peroxy)hexane, di-2-tert-butylperoxy isopropyl benzene, dicumylperoxide, 1,1-di(tert-amylperoxy) cyclohexane, ethyl-3,3-di-tert-amyl peroxybutyrate, ethyl-3,3-di-tert-butyl peroxybutyrate, 1,1-di-tert-(butylperoxy) 3,3,5-trimethyl cyclohexane, N-butyl-4,4-bis-tert-butyl peroxyvalerate, 1,1-di-(tert-butylperoxy) cyclohexane, succinic acid peroxide, 2-hydroxy-1,1-dimethyl butylperoxy-neodecanoate, tert-amyl peroxy-2-ethylhexanoate, tert-butyl peroxypivalate, tert-butyl peroxyneodecanoate, di-n-propyl peroxydicarbonate, di-2-ethylhexyl peroxydicarbonate, di-sec-butyl peroxydicarbonate, alpha-cumyl peroxyneoheptanoate, tert-amyl-peroxyneodecanoate, tert-amyl peroxypivalate, 2,5-dimethyl-2,5-bis-2-ethyl hexanoyl peroxy hexane, didecanoyl proxide, tert-butyl peroxy 2-ethylhexanoate, 4,4'-azobis(4-cyanovaleric acid), 1,1'-azobis(cyclohexane-1-carbonitrile), azobis(isobutyronitrile) (AIBN), 2,2'-azobis-(2-methylpropionamidine) dihydrochloride, 2,2'-azobis(4-methoxy-2,4-dimethylvaleronitrile), 2,2'-azobis(2,4-dimethylvaleronitrile), 2,2'-azobis(2-methylbutyronitrile), dimethyl 2,2'azobis(2-methylpropionate), 2,2'-azobis [2-methyl-N-(2-hydroxyethyl)propionamide, 2,2'-azobis(N-butyl-2-methylpropionamide), 2,2'-azobis[2-(2-imidazolin-2-yl)propane]dihydrochloride, 2,2'-azobis[2-(2-imidazolin-2-yl)propane], 2,2'-azobis[N-(2-carboxyethyl)-2-methyl-propionamidine]tetrahydrate, 4,4-azobis(4-cyanovaleric acid) polymers and copolymers thereof, 4,4-azobis(4-cyanopentanoic acid) polymers and copolymers thereof, or mixtures of any of the above compounds. In accordance with certain embodiments of the invention, the thermal initiator (s) are those that do not produce gaseous byproducts during thermally-induced decomposition. For instance, generally peroxide based initiators are preferred to azo initiators as azo initiators generate gaseous byproducts. In accordance with certain embodiments of the invention, thermal initiators possessing a self-accelerating decomposition temperature (SADT)>approximately 50° C. may be particularly desirable since they can be most safely handled and formulated without special precaution or equipment. Non-limiting examples include dilauryl peroxide and dibenzoyl peroxide.

In accordance with certain embodiments of the invention, the method may further comprise incorporating a separator with the GPE. For instance, the method may comprise adhering a separator to a surface of the GPE or embedding a separator within the GPE. For example, the separator may comprise a variety of materials suitable for use in an electrochemical cell, such as cellulose, glass fibers, polyolefins, polyamides, polyethylene terephthalates, or any combinations thereof. The separator for example, may comprise a variety of forms, such as a mesh structure, a woven material, or a nonwoven material. In accordance with certain embodiments of the invention, the separator may be adhered to a surface of the GPE with the GPE at least partially penetrating into the openings or porous pathways of the separator without fully enveloping the separator. Such a configuration may be obtained, for example, by positioning the separator on a substrate, such as an electrode, and coating the separator with a GPE-composition followed by curing the GPE-composition to form a GPE including a separator located at a surface of the GPE. In accordance with certain embodiments of the invention, the GPE may include a separator that is fully embedded within the thickness of the GPE. For example, the separator may not be exposed to an ambient environment due to being fully encapsulated by the GPE. Such a configuration may be obtained, for example, by positioning the separator within a mold and pouring a GPE-composition inside the mold to fully encapsulate the separator followed by curing the GPE-composition to form a GPE including a separator fully embedded therein.

In accordance with certain embodiments of the invention, the methods of forming a GPE may comprise radically-curing a GPE-composition including a mixture of monomers comprising (i) a first group of monomers comprising at least a first monomer including at least three (3) thiol functional groups and a second monomer comprising, for example, an aliphatic chain including at least two (2) vinyl or at least one (1) alkyne functional groups; or (ii) a second group of monomers comprising at least a third monomer including an acrylate or methacrylate functional groups and a fourth polymer including at least two (2) free-radically polymerizable functional groups. In accordance with certain embodiments of the invention, the methods may comprise a step of mixing either the first group of monomers or the second group of monomers and adding an electrolyte alone and/or with water to provide the GPE-composition and depositing a coating of the GPE-composition onto a substrate prior to or during radically-curing the GPE-composition. In accordance with certain embodiments of the invention, the GPE-composition may comprise the combination of monomers, one or more electrolytes, optionally a viscosity reducing agent, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In another aspect, embodiments of the present invention provide methods of forming an electrochemical cell. In accordance with certain embodiments of the invention, the methods may include providing an anode, providing a cathode, and depositing a GPE between and in contact with the anode and the cathode. In accordance with certain embodiments of the invention, depositing the GPE may comprise positioning a pre-fabricated GPE between the anode and the cathode or forming the GPE directly onto the anode or the cathode. In accordance with certain embodiments of the invention, depositing the GPE may comprise forming a first GPE-layer directly onto the anode and forming a second GPE-layer directly onto the cathode, and further comprising a step of joining the first GPE-layer and the second GPE-layer together such that the first GPE-layer and the second GPE-layer are located between the anode and the cathode.

In accordance with certain embodiments of the invention, the GPE may include a separator adhered or embedded therein as described and disclosed herein. Additionally or alternatively, the method may comprise positioning the separator on top of the cathode or anode followed by coating the separator and electrode supporting the separator with a GPE-composition and allowing or facilitating the GPE-composition to penetrate into the separator. After the GPE-composition has penetrated into the separator, the GPE-composition may be radically cured as described and disclosed herein.

In another aspect, the present invention provided DES-based GPE-compositions and/or GPEs. In accordance with certain embodiments of the invention, for example, the DES-based GPE-compositions may comprise a three-dimensionally cross-linkable monomeric mixture and an electrolyte composition comprising the combination of a (i) DES component having a eutectic point of less than or equal to 25° C. and (ii) a water-in-salt (WiS) or a water-in-bisalt (WiBS) component comprising at least one electrolyte and water. Electrochemical cells including such GPEs formed from such GPE-compositions, in accordance with certain embodiments of the invention, may have increased ionic conductivity at reduced water content. In accordance with certain embodiments of the invention, the integration of the combination of the DES and WiS or WiBS into the polymer network of the GPE may beneficially improve cycle life compared to the use of a WiS or WiBS alone as an electrolyte composition.

In accordance with certain embodiments of the invention, the DES component in combination with the WiS or WiBS component may be admixed with a three-dimensionally cross-linkable monomeric mixture such that the resulting GPE-composition may then be subjected to a polymerization process (e.g., UV-curing operation or thermally curing operation) to provide a GPE including a polymer network housing an electrolyte composition including both the DES component and the WiS or WiBS component. In this regard, the addition of the WiS or WiBS component provides the GPE-composition a minor amount of water (e.g., prior to initial use) which may be desirable, for instance, to improve ionic conductivity, and thus, enhance capacity without compromising coulombic efficiency.

Certain embodiments according to the invention, for example, provide a GPE-composition including a three-dimensionally cross-linkable monomeric mixture and an electrolyte composition including an electrolyte composition, in which the electrolyte composition comprises, for example as a first component, a DES having a eutectic point (e.g., lowest freezing/solidifying temperature for the DES) of less than or equal to 25° C. In accordance with certain embodiments of the invention, the DES may have a eutectic point of less than about 25° C., such as a eutectic point of equal to or less than about any of the following: 25° C., 20° C., 15° C., 10° C., 5° C., 0° C., −5° C., −10° C., −15° C., −20° C., and −25° C. In accordance with certain embodiments of the invention, the DES includes a eutectic point that is below the operating temperature of an electrochemical cell such that the DES remains in a liquid state over the entire operating window of the electrochemical cell. In accordance with certain embodiments of the invention, the presence of polymer network may further suppress the eutectic point of the DES. The electrolyte composition, in accordance with certain embodiments of the invention, may also include a WiS or the WiBS component that has a weight percentage of salt from about 20% to about 90% (e.g., 20-90 wt. % of salt), such as at least about any of the following: 20, 25, 30, 35, 40, 45, 50, 55, 60, 65, and 70 wt. % of salt and/or at most about any of the following: 90, 85, 80, 75, 70, 65, 60, and 55 wt. % of salt. In accordance with certain embodiments of the invention, the electrolyte composition may have a weight ratio between the WiS or WiBS component and the DES component from about 1:15 to about 15:1, such as at least about any of the following: 1:15, 1:12, 1:10, 1:9, 1:8, 1:7, 1:6, 1:5, 1:4, 1:3, 1:2 and 1:1 and/or at most about any of the following: 15:1, 12:1, 10:1, 9:1, 8:1, 7:1, 6:1, 5:1, 4:1, 3:1, 2:1, and 1:1.

The three-dimensionally cross-linkable monomeric mixture may comprise a mixture of monomer as described and disclosed herein that react via a radically mediated addition (e.g., via UV or thermal initiation) of monomers that form across-linked three-dimensional polymer network. For example, the three-dimensionally cross-linkable monomeric mixture may form the polymer network (e.g., cross-linked or cured) that is compatible with the DES component. The three-dimensionally cross-linkable monomeric mixture upon reaction may form a cross-linked three-dimensional polymer network, for example, comprising the reaction product of a plurality of monomers including at least a first monomer comprising multiple thiol functional groups and at least a second monomer comprising multiple vinyl functional groups; wherein a number of thiol functional groups is greater than or equal to 2; a number of the vinyl functional groups is greater than or equal to 2; and a sum of the thiol functional groups and the vinyl groups across the plurality of monomers is at least greater than or equal to 5. Stated somewhat differently, the cross-linked three-dimensional polymer network based on thiol-ene systems may comprise at least one multifunctional thiol and one multifunctional vinyl compound, in which the thiol functionality is greater than or equal to 2, the vinyl functionality is greater than or equal to 2 (where an alkyne counts as 2 functional units), and the sum of the functionality across all monomers is at least greater than or equal to 5. In accordance with certain embodiments of the invention, the three-dimensionally cross-linkable monomeric mixture upon reaction may form a cross-linked three-dimensional polymer network comprising the reaction product of the first monomer, the second monomer, and a third monomer including at least two (2) thiol functional groups, wherein the first monomer and the third monomer are different. In accordance with certain embodiments of the invention, the each of the first monomer, the second monomer, and the third monomer may be substantially water soluble.

In accordance with certain embodiments of the invention, the three-dimensionally cross-linkable monomeric mixture upon reaction may form a cross-linked three-dimensional polymer network comprising the reaction product of at least a first monomer including an acrylate or methacrylate functional group and a second monomer or oligomer including at least two (2) free-radically polymerizable functional groups. In accordance with certain embodiments of the invention, the at least two (2) free-radically polymerizable functional groups may independently from each other comprise, for example, an acrylate or methacrylate group, an allylic group, an alkynyl, a styrenic group, a vinyl ester, a vinyl amide, a vinyl amine, a maleate group, a fumarate group, a vinyl ether group, an acrylamide group, a methacrylamide group, an itaconate group, or a norbornene group. In accordance with certain embodiments of the invention, at least one of the first monomer and the second monomer includes poly(ethylene glycol), poly(propylene glycol), or hydroxyl functionality.

In accordance with certain embodiments of the invention, the three-dimensionally cross-linkable monomeric mixture upon reaction may form a cross-linked three-dimensional polymer network comprising the reaction product of a variety of monofunctional monomers, difunctional monomers (e.g., cross-linkers), trifunctional monomers (e.g., cross-linkers), higher functional monomers (e.g., cross-linkers), and solvents/additives. Example monofunctional monomers include p-hydroxystyrene, 2-hydroxyethyl (meth)acrylate, hydroxypropyl (meth)acrylate, N-(hydroxymethyl) (meth)acrylamide, N-hydroxyethyl (meth)acrylamide, glycerol (meth)acrylate, hydroxybutyl (meth)acrylate, N,N-dimethylacrylamide, N-vinyl pyrrolidinone, 2-allyloxyethanol, (meth)acrylic acid, itaconic acid, 2-carboxyethyl (meth) acrylate, poly(ethylene glycol) (meth)acrylate, poly(ethylene glycol) methyl ether (meth)acrylate, poly(ethylene glycol) ethyl ether (meth)acrylate, poly(ethylene glycol) phenyl ether (meth)acrylate, ethylene glycol methyl ether (meth)acrylate, ethylene glycol phenyl ether (meth)acrylate, diethylene glycol ethyl ether (meth)acrylate, poly(ethylene glycol) (meth)acrylate, diethylene glycol (meth)acrylate, triethylene glycol (meth)acrylate, tetraethylene glycol (meth)acrylate, diethylene glycol methyl ether (meth)acrylate, triethylene glycol methyl ether (meth)acrylate, and tetraethylene glycol methyl ether (meth)acrylate.

Example difunctional monomers include allyl (meth)acrylate, glycidyl methacrylate, ethylene glycol dicyclopentyl ether (meth)acrylate, triethylene glycol divinyl ether, poly(ethylene glycol) diacrylamide, poly(ethylene glycol) di(meth)acrylate, ethylene glycol di(meth)acrylate, diethylene glycol di(meth)acrylate, triethylene glycol di(meth)acrylate, tetraethylene glycol di(meth)acrylate, propanediol di(meth)acrylate, 1,4-butanediol di(meth)acrylate, 1,5-pentanediol di(meth)acrylate, 1,6-hexanediol di(meth)acrylate, 1,10-bis(acryloyloxy)decane, 1,12-dodecanediol di(meth)acrylate, poly(silicone-alt-PEG) di(meth)acrylate, poly(propylene glycol) di(meth)acrylate, bisphenol A propoxylate di(meth)acrylate, neopentylglycol propoxylate di(meth)acrylate, glycerol ethoxylate-co-propoxylate di(meth)acrylate, propylene glycol di(meth)acrylate, pentaerythritol propoxylate di(meth)acrylate, tri(propylene glycol) di(meth)acrylate, and diurethane dimethacrylate (DUDMA).

Example trifunctional monomers include 1,3,5-triallyl-2,4,6(1H,3H,5H)-trione, 2,4,6,-triallyloxy-1,3,5,triazine, trimethylolpropane propoxylate tri(meth)acrylate, glycerol propoxylate tri(meth)acrylate, polycaprolactone tri(meth)acrylate (PCLTMA), tris-(4-hydroxyphenyl)ethane tri(meth)acrylate, trimethylolpropane ethoxylate tri(meth)acrylate, glycerol ethoxylate tri(meth)acrylate, and pentaerythritol ethoxylate tri(meth)acrylate.

Higher functional monomers (crosslinkers) include ethylenediamine tetrakis(ethoxylate-block-propoxylate) tetra(meth)acrylate, and pentaerythritol propoxylate tetra(meth)acrylate.

Example solvents/additives include ethylene glycol, diethylene glycol, triethylene glycol, tetraethylene glycol, ethylene glycol monomethyl ether, diethylene glycol monomethyl ether, triethylene glycol, tetraethylene glycol monomethyl ether, poly(propylene glycol), carbonate solvents, and plasticizers. In accordance with certain embodiments of the invention, a solvent can be added to reduce the viscosity of the GPE-compositions (pre-cured), which facilitates penetration into the pores of the electrode and also improves conductivity. In accordance with certain embodiments of the invention, the GPE-composition may include a viscosity reducing agent as described and disclosed herein. For example, the GPE-composition may comprise an organic solvent, such as a polar solvent. In accordance with certain embodiments of the invention, the organic solvent may comprise a polar protic solvent, a polar aprotic solvent, or combinations thereof. In accordance with certain embodiments of the invention, the organic solvent may be devoid of hydroxyl groups. The organic solvent, in accordance with certain embodiments of the invention, includes or is a polar aprotic solvent. For example, the organic solvent may have a dipole moment of at least about 3 D, at least about 4 D, or at least about 5 D. In accordance with certain embodiments of the invention, the organic solvent has a Polarity Index of at least about 4, at least about 5, at least about 6, or at least about 7. Non-limiting examples of such organic solvents suitable as viscosity reducing agents include cyclic carbonates, such as propylene carbonate, ethylene carbonate, or trimethylene carbonate. Additional examples of viscosity reducing agents include acetonitrile and tetrahydrofuran. In accordance with certain embodiments of the invention, the GPE-composition may comprise from about 1 wt. % to about 25 wt. % of the organic solvent, such as at least about any of the following: 1, 3, 5, 8, 10, 12, and 15 wt. % and/or at most about any of the following: 25, 22, 20, 18, 15, 12, and 10 wt. %. In accordance with certain embodiments of the invention, the GPE-composition including a viscosity reducing agent may also include a three-dimensionally cross-linkable monomeric mixture, such as those described and disclosed herein, and an electrolyte composition, such as those descried and disclosed herein. Additionally, the GPE-compositions including a viscosity reducing agent may be radically cured (e.g., UV-cured or thermally cured) to provide a GPE suitable for incorporation into an electrochemical cell.

In accordance with certain embodiments of the invention, the cross-linkable group of monomers comprise from about 20% to about 80% by weight of the GPE-composition, and the DES component comprises from about 20% to about 80% by weight of the GPE-composition. For example, the cross-linkable group of monomers may comprise at most about any of the following: 80, 75, 70, 65, 60, 55, 50, 45, and 40% by weight of the GPE-composition and/or at least about any of the following: 20, 25, 30, 35, 40, 45, and 50% by weight of the GPE-composition. Additionally or alternatively, the DES component may comprise at most about any of the following: 80, 75, 70, 65, 60, 55, 50, 45, and 40% by weight of the GPE-composition and/or at least about any of the following: 20, 25, 30, 35, 40, 45, and 50% by weight of the GPE-composition.

In accordance with certain embodiments of the invention, the DES component comprises at least one hydrogen bond donor and at least one hydrogen bond acceptor. For instance, the at least one hydrogen bond acceptor may include at least one localized lone electron pair in accordance with certain embodiments of the invention. The at least one hydrogen bond acceptor, for example, may comprise a lithium salt, a zinc salt, or combination thereof. By way of example only, the at least one hydrogen bond acceptor may comprise lithium bis(trifluoromethanesulfonyl)imide (LiTFSI), lithium trifluoromethanesulfonate (LiOTf), lithium chloride (LiCl), lithium hexafluorophosphate (LiPF6), a lithium polysulfide, lithium perchlorate (LiClO4), lithium bromide (LiBr), lithium iodide (LiI), lithium thiocyanate (LiSCN), lithium tetrafluoroborate (LiBF4), lithium hexafluoroarsenate (LiAsF$_6$), lithium bis(oxalate)borate (LiBOB), lithium difluoro)oxalate)borate (LiDFOB), LiFAP [LiPF3(CF2CF3)3], zinc trifluoromethanesulfonate (Zn(OTf)2), or zinc di[bis(trifluoromethanesulfonyl)imide)] Zn(TFSI)2, and combinations thereof.

Additionally or alternatively, the hydrogen bond accept or may comprise a salt having a positively charged nitrogen atom, a positively charged phosphorous atom, an alcohol, a carboxylic acid, a primary amine, a secondary amine, a tertiary amine, or combinations thereof. Non-limiting examples of hydrogen bond acceptors include the following;

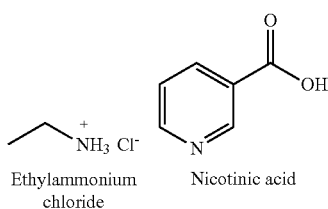

Ethylammonium chloride

Nicotinic acid

-continued

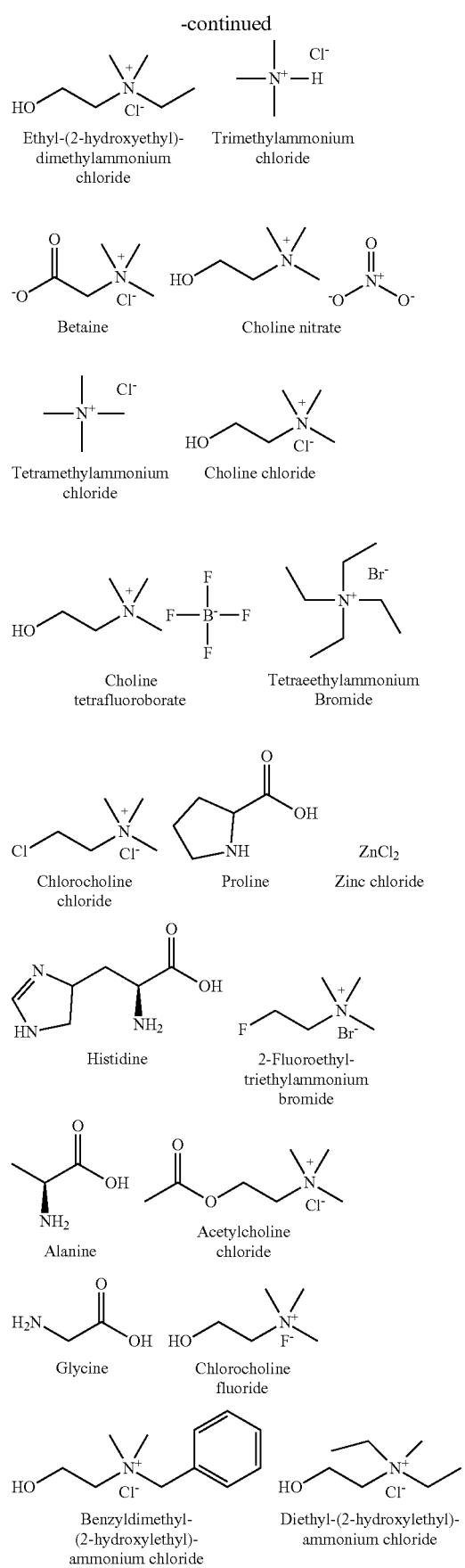

Ethyl-(2-hydroxyethyl)-dimethylammonium chloride

Trimethylammonium chloride

Betaine

Choline nitrate

Tetramethylammonium chloride

Choline chloride

Choline tetrafluoroborate

Tetraethylammonium Bromide

Chlorocholine chloride

Proline

ZnCl$_2$

Zinc chloride

Histidine

2-Fluoroethyl-triethylammonium bromide

Alanine

Acetylcholine chloride

Glycine

Chlorocholine fluoride

Benzyldimethyl-(2-hydroxylethyl)-ammonium chloride

Diethyl-(2-hydroxylethyl)-ammonium chloride

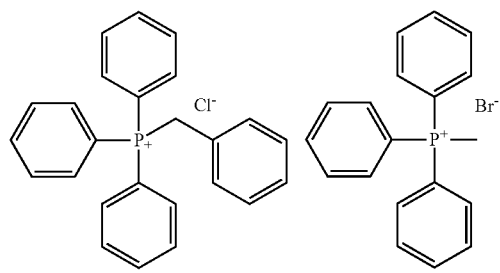

(Phenylmethyl)triphenyl phosphonium chloride

Methyltriphenyl phosphonium bromide

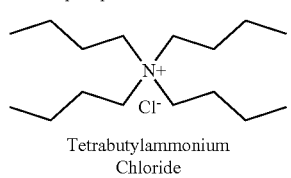

Tetrabutylammonium Chloride

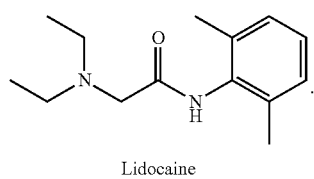

Lidocaine

In accordance with certain embodiments of the invention, the at least one hydrogen bond donor comprises a hydrogen atom bonded to a heteroatom (e.g., a nitrogen atom, an oxygen atom, or a fluorine atom). For example, the at least one hydrogen bond donor may comprise a carboxylic acid, an amide, and/or a urea. Non-limiting examples of hydrogen bond donors include the following:

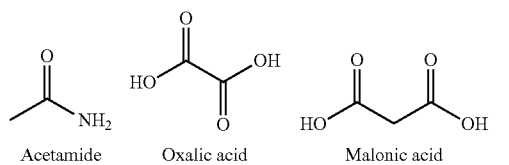

Acetamide   Oxalic acid   Malonic acid

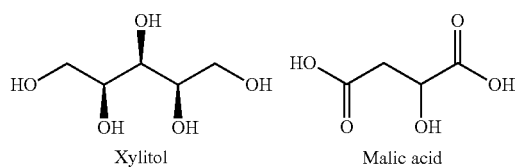

Xylitol   Malic acid

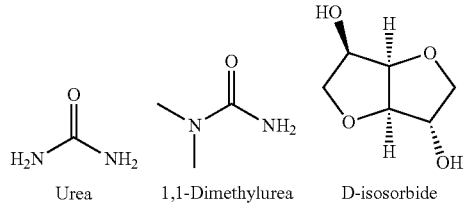

Urea   1,1-Dimethylurea   D-isosorbide

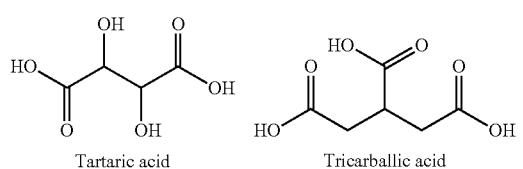

Tartaric acid   Tricarballic acid

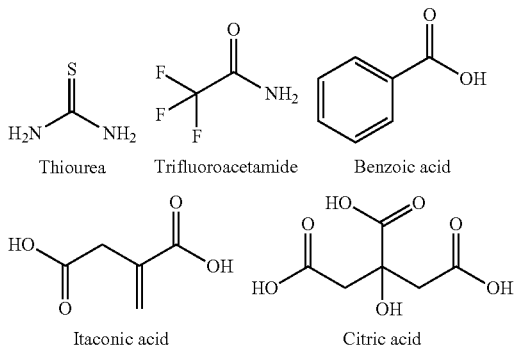

Thiourea   Trifluoroacetamide   Benzoic acid

Itaconic acid   Citric acid

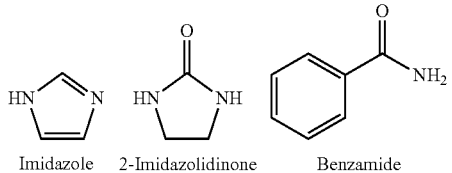

Imidazole   2-Imidazolidinone   Benzamide

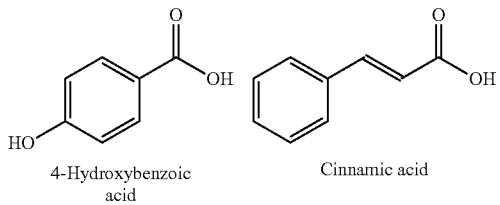

4-Hydroxybenzoic acid   Cinnamic acid

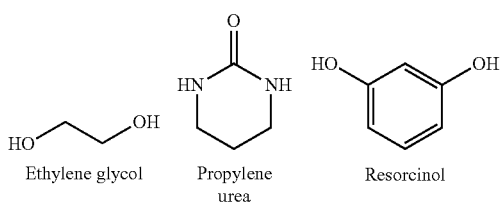

Ethylene glycol   Propylene urea   Resorcinol

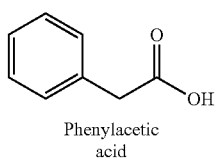

Phenylacetic acid

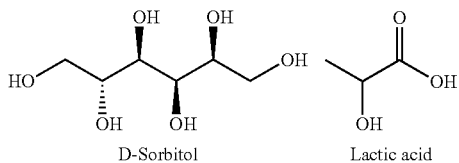

D-Sorbitol   Lactic acid

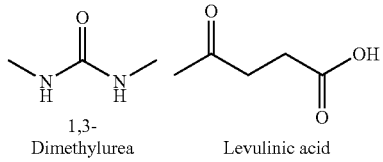

1,3-Dimethylurea   Levulinic acid

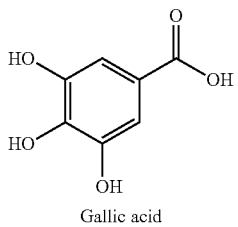

Gallic acid

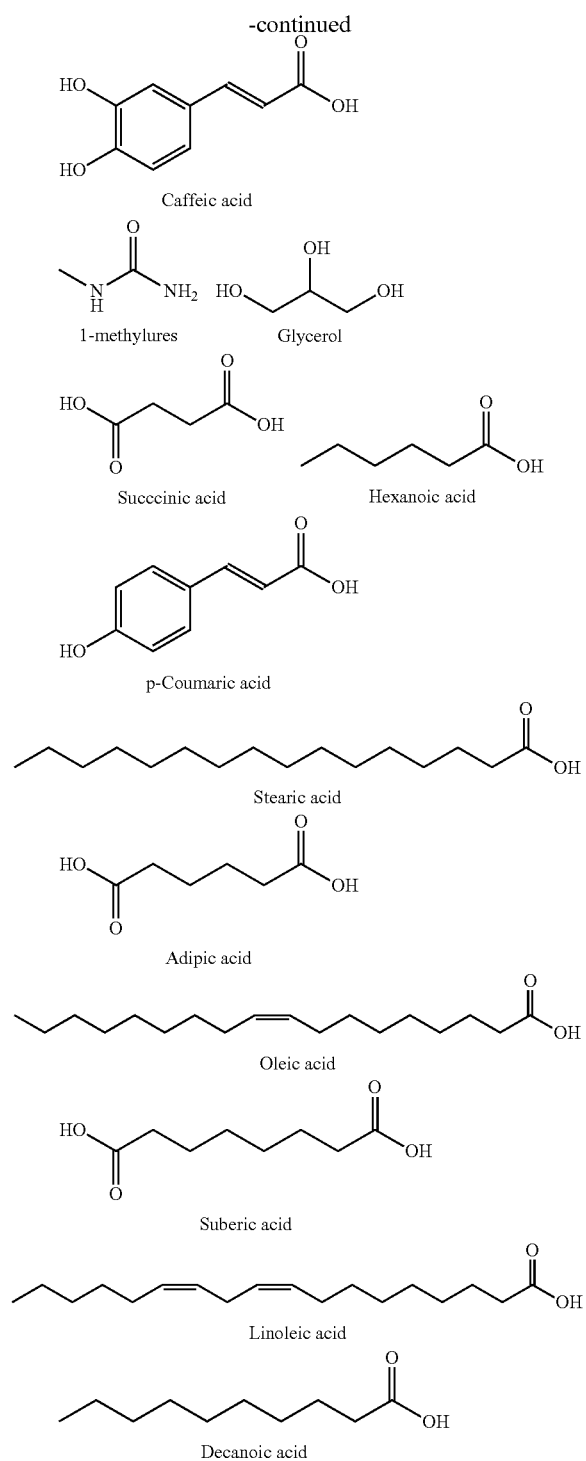

In accordance with certain embodiments of the invention, the DES component may comprise one or more of the following example combinations of a hydrogen bond donor with a hydrogen bond acceptor: N-methylacetamide-LiTFSI, trifluoroacetamide-LiTFSI, N-methyltrifluoroacetamide, urea-LiTFSI, N-methylurea-LiTFSI, N,N-dimethylurea-LiTFSI, N,N'-dimethylurea-LiTFSI, N,N,N'-trimethylurea-LiTFSI, ethylene glycol-LiTFSI, Urea-ZnCl2 plus LiTFSI (e.g., used with Zn metal anode, LMO cathode), choline chloride-ethylene glycol (1:3) plus 5 wt. % LiTFSI (conductivity data, 1.4 mS/cm), choline chloride-ethylene glycol (1:3) plus 10 wt. % LiTFSI (conductivity data, 1.6 mS/cm), choline chloride-ethylene glycol (1:3) plus 20 wt. % LiTFSI (conductivity data, 0.8 mS/cm), and choline chloride-lactic acid (1:2) plus 5 wt. % LiTFSI (conductivity data, 1.25 mS/cm).

In accordance with certain embodiments of the invention, the at least one hydrogen bond donor comprises from about 10 mole % to about 90 mole % of the DES component, and the at least one hydrogen bond acceptor comprises from about 10 mole % to about 90 mole % of the DES component. For example, the at least one hydrogen bond donor may comprise at most about any of the following: 90, 85, 80, 75, 70, 65, 60, 55, 50, 45, and 40 mole % of the DES component and/or at least about any of the following: 20, 25, 30, 35, 40, 45, and 50 mole % of the DES component. Additionally or alternatively, the hydrogen bond acceptor may comprise at most about any of the following: 90, 85, 80, 75, 70, 65, 60, 55, 50, 45, and 40 mole % of the DES component and/or at least about any of the following: 20, 25, 30, 35, 40, 45, and 50 mole % of the DES component.

In accordance with certain embodiments of the invention, the eutectic composition is defined by a first amount of the at least one hydrogen bond donor (e.g., mole % of the hydrogen bond donor) and a second amount of the hydrogen bond acceptor (e.g., mole % of the hydrogen bond acceptor), and the DES component comprises a mixture of: (i) the at least one hydrogen bond donor present within about 30% (e.g. within about 20%, 10%, 5%, or 3%) of the first amount, and/or (ii) the at least one hydrogen bond acceptor within about 30% (e.g. within about 20%, 10%, 5%, or 3%) of the second amount.

In accordance with certain embodiments of the invention, the electrolyte composition includes an amount of water (e.g., prior to an initial charge) via the WiS or WiBS component comprising from about 0.1% to about 30% by weight of the electrolyte composition. For instance, the electrolyte composition may include an amount of water (e.g., prior to an initial charge) from at least about any of the following: 0.1, 0.2, 0.3, 0.4, 0.5, 1, 3, 5, 10, 15, and 20% by weight of the electrolyte composition and/or at most about any of the following: 30, 25, 20, 15, and 10% by weight of the electrolyte composition.

The GPE composition, in accordance with certain embodiments of the invention, may comprise a conductivity of at least $1\times10^{-4}$ S/cm, at least $5\times10^{-4}$ S/cm, or at least $1\times10^{-3}$ S/cm.

In accordance with certain embodiments of the invention, the three-dimensionally cross-linkable monomeric mixture may be radically cured, such as by a UV-curing and/or thermal curing. For example, the GPE-composition may also include a thermal initiator to facilitate thermal curing of the GPE-composition to form a GPE suitable for incorporation within an electrochemical cell. In accordance with certain embodiments of the invention, the GPE-compositions (e.g., pre-cured composition) comprising the combination of monomers may also comprise a free radical initiator (e.g., chemical initiator, thermal initiator, photo-initiator, or redox initiation system), in which the free radical initiator may be present from about 0.25 to about 10 wt. % of the total monomer mass in the composition prior to being radically-cured. In accordance with certain embodiments of the invention, the free radical initiator may be present from about any of the following: 10, 9, 8, 7, 6, 5, 4, 3, 2, and 1 wt. % of the total monomer mass in the composition prior to being radically-cured and/or at least about any of the following: 0.25, 0.5, 0.75, 1, 1.25, 1.5, 1.75, 2, 2.25, and 2.5 wt. % of the total monomer mass in the composition prior to being radically-cured.

In accordance with certain embodiments of the invention, the GPE-composition may comprise a thermal initiator as described and disclosed herein. The thermal initiator, for example, may comprise a self-accelerating decomposition from about 40° C. to about 120° C., such as at least about any of the following: 40, 50, 60, 70, and 80° C. and/or at most about any of the following: 120, 110, 110, 100, 90, and 80° C. In accordance with certain embodiments of the invention, the thermal initiator may be selected that has a decomposition rate that is sufficiently high enough at useful temperatures. In accordance with certain embodiments of the invention, the decomposition rate $K_d$ ($s^{-1}$) of the thermal initiator may comprise a value exceeding about $1.0 \times 10^{-5}$ at 100° C., or exceeding about $1.0 \times 10^{-4}$ at 100° C., or exceeding about $1.0 \times 10^{-3}$ at 100° C. It should be noted that $K_d$ values of thermal initiators will decrease as the temperature is decreased. Accordingly, thermal initiators having $K_d$ values less than or at $1 \times 10^{-5}$ at 100° C. may not be desirable in accordance with certain embodiments of the invention. Table 3, provided above, lists decomposition data for selected initiators in benzene. All data in Table 3 is taken from "Polymer Handbook", Eds. Brandrup, J; Immergut, E. H.; Grulke, E. A., 4th Edition, John Wiley, New York, 1999. Thermal initiators in bold font represent a few example thermal initiators that may be preferred in accordance with certain embodiments of the invention.

In accordance with certain embodiments of the invention, the thermal initiator may be present in the GPE-composition from about 1-5% by weight of the GPE-composition, such as at least about any of the following: 1, 1.5, 2, 2.5, and 3% by weight of the GPE-composition and/or at most about any of the following: 5, 4.5, 4, 3.5, and 3% by weight of the GPE-composition. Non-limiting examples of thermal initiators are provided above.

In another aspect, certain embodiments of the invention provide a DES-based GPE (e.g., cured form of a GPE-composition). For example, the DES-based GPE may comprise (i) a cross-linked three-dimensional polymer network comprising a reaction product of a three-dimensionally cross-linkable monomeric mixture, such as those described and disclosed herein; and (ii) an electrolyte composition comprising (a) a deep eutectic solvent (DES) component having a eutectic point of less than or equal to 25° C. and (b) a water-in-salt (WiS) or a water-in-bisalt (WiBs) component comprising at least one electrolyte and water.

In accordance with certain embodiments of the invention, the GPE (e.g., DES-based GPE) may be provided in the form of a water-swellable hydrogel. Alternatively, the GPE may not be water-swellable, or even a hydrogel. For instance, the GPE may be anhydrous (e.g., devoid of water prior to an initial use). Anhydrous GPE compositions, for example, may be particularly suitable for use with water sensitive electrodes such as graphite and lithium metal. In accordance with certain embodiments of the invention, the GPE composition may be provided in the form of film (e.g., free standing film) having a thickness from 10 to 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In accordance with certain embodiments of the invention, the cross-linked three-dimensional polymer network comprises from about 10% to about 50% by weight of the GPE, such as at least about any of the following: 10, 12, 15, 18, and 20% by weight of the GPE and/or at most about any of the following: 50, 45, 40, 35, 30, 25, and 20% by weight of the GPE.

In accordance with certain embodiments of the invention, the GPE may further comprise a separator adhered to a surface thereof or embedded within the GPE. For example, the separator may comprise a variety of materials suitable for use in an electrochemical cell, such as cellulose, glass fibers, polyolefins, polyamides, polyethylene terephthalates, or any combinations thereof. The separator for example, may comprise a variety of forms, such as a mesh structure, a woven material, or a nonwoven material. In accordance with certain embodiments of the invention, the separator may be adhered to a surface of the GPE with the GPE at least partially penetrating into the openings or porous pathways of the separator without fully enveloping the separator. Such a configuration may be obtained, for example, by positioning the separator on a substrate, such as an electrode, and coating the separator with a GPE-composition followed by curing the GPE-composition to form a GPE including a separator located at a surface of the GPE. In accordance with certain embodiments of the invention, the GPE may include a separator that is fully embedded within the thickness of the GPE. For example, the separator may not be exposed to an ambient environment due to being fully encapsulated by the GPE. Such a configuration may be obtained, for example, by positioning the separator within a mold and pouring a GPE-composition inside the mold to fully encapsulate the separator followed by curing the GPE-composition to form a GPE including a separator fully embedded therein.

In another aspect, embodiments of the present invention provide an electrochemical cell including an anode, a cathode, and a GPE positioned between and in contact with the anode and the cathode. In accordance with certain embodiments of the invention, the GPE includes a polymer network and an electrolyte composition absorbed by the GPE. In accordance with certain embodiments of the invention, the electrolyte composition comprises (i) a deep eutectic solvent (DES) component having a eutectic point of less than or equal to 25° C. and (ii) a water-in-salt (WiS) or a water-in-bisalt (WiBS) component comprising at least one electrolyte and water. In accordance with certain embodiments of the invention, the anode comprises an anode-composition comprising an active anode species and the cathode comprises a cathode-composition comprising an active cathode species.

In accordance with certain embodiments of the invention, the electrochemical cells may be provided in a variety of different shapes and forms and may comprise primary and secondary electrochemical cells. For instance, electrochemical cells in accordance with certain embodiments of the invention may comprise a rigid or non-rigid configuration. Non-rigid configurations, for example, may comprise an electrochemical cell that may be flexible such that the electrochemical cell's shape or configuration may be adjustable (e.g., movable between linear/flat configuration to an arcuate configuration) prior to or during operation. In accordance with certain embodiments of the invention, the electrochemical cells may include one or more electrode (e.g., anode and/or cathode) including a gel polymer electrolyte or derivative thereof as a component (e.g., as a binder) forming the electrode. In accordance with certain embodiments of the invention, the GPE may be in intimate contact with and interpenetrating the electrode.

In accordance with certain embodiments of the invention, the GPE may comprise a cured GPE-composition and has a weight percentage of salt from about 20% to about 90%

(e.g., 20-90 wt. % of a salt), such as at least about any of the following: 20, 25, 30, 35, 40, 45, 50, 55, 60, 65, and 70 wt. % of salt and/or at least about any of the following: 90, 85, 80, 75, 70, 65, 60, 55, and 50 wt. % of a salt.

In accordance with certain embodiments of the invention, the electrochemical cells may comprise an operational voltage window from about 1 to about 6 volts, such as at most about any of the following: 6, 5.5, 5, 4.5, 4, 3.5, 3, and 2.5 volts and/or at least about any of the following: 1, 1.25, 1.5, 1.75, 2, 2.25, 2.5, 2.75, 3, 3.25, 3.5, 3.75, and 4 volts.

In accordance with certain embodiments of the invention, the electrochemical cells may comprise an initial discharge capacity for an initial cycle and a second discharge capacity for a 10th cycle, wherein a capacity reduction from the initial cycle to the 10th cycle is less than about 20%, such as less than about 18%, 15%, 12%, 10%, 8%, 6%, 4%, 2%, or 1%. The electrochemical cell, in accordance with certain embodiments of the invention, comprises from about 0.1 to about 50% by weight water, such as at least about any of the following: 0.1, 0.5, 1, 3, 5, 8, 10, 12, 15, 18, 20, and 25% by weight water and/or at most about any of the following: 50, 45, 40, 35, 30, 25, and 20% by weight water.

In accordance with certain embodiments of the invention, the anode of the electrochemical cell may comprise an anode-composition comprising (a) an active anode species and (b) optionally a cured GPE-composition, in which the active anode species and the cured GPE-composition are admixed together. For example, the cured GPE-composition, which may be tacky, may be used by replacing traditional electrode binders such as styrene-butadiene rubber (SBR) and polyvinylidene fluoride (PVDF) based binders. In this regard, anodes in accordance with certain embodiments of the invention may be devoid on an SBR and/or PVDF. Additionally or alternatively, the cathode of the electrochemical cell may comprise a cathode-composition comprising (a) an active cathode species and (b) a cured GPE-composition; wherein the active cathode species and the cured GPE-composition are admixed together. For example, the cured GPE-composition, which may be tacky, may be used by replacing traditional electrode binders such as styrene-butadiene rubber (SBR) and polyvinylidene fluoride (PVDF) based binders. In this regard, cathodes in accordance with certain embodiments of the invention may be devoid on an SBR and/or PVDF. Additionally or alternatively, the anode-composition may include traditional electrode binders, such as styrene-butadiene rubber (SBR) and polyvinylidene fluoride (PVDF) based binders. For example, the GPE-composition (e.g., pre-cured composition) may penetrate the pores of the porous electrode, which may be held together by traditional electrode binders.

In accordance with certain embodiments of the invention, the cathode and/or the anode may comprise at least one active surface that comprises a surface of an electrode that is in physical contact with the GPE and at which electrochemical reactions may take place. For example, cathode may include cathode active surface and/or the anode can include anode active surface. In accordance with embodiments of the invention, in which the anode and/or cathode include a cured GPE-composition or derivative thereof incorporated therein (e.g., as a binder for the active species), the active surface may not be a simple planar interface but the active surface or interface may effectively penetrate into the respective electrode by virtue of utilizing the pre-cured GPE-composition or derivative thereof into the electrode followed by curing. In this regard, the interface area (e.g., surface area) between the GPE and the electrodes may effectively be greatly increased per a given exterior surface area or volume of the electrodes. Additionally or alternatively, the anode and/or cathode may be formed and/or held together with traditional electrode binders, such as styrene-butadiene rubber (SBR) and polyvinylidene fluoride (PVDF) based binders, and the GPE-composition (e.g., pre-cured composition) may penetrate the pores of the porous electrode, which may be held together by traditional electrode binders. In accordance with certain embodiments of the invention, the active surface may not be a planar interface. For example, the active surface or interface may effectively penetrate into the respective electrode by virtue of the penetration of the GPE-composition (pre-cured) into the electrode followed by radically curing the GPE-composition to form a cross-linked GPE having an irregular interface with the electrode(s) (e.g., an conformal interface). In this regard, the interface area (e.g., surface area) between the GPE and the electrodes may effectively be greatly increased per a given exterior surface area or volume of the electrodes.

As used herein, the term "anode active species" may comprise any electrochemically active species associated with the anode. For example, the anode may comprise graphite, lithium, zinc, silicon, tin oxides, antimony oxides, or a lithium-containing material, such as lithium titanium oxide. In accordance with certain embodiments of the invention, the anode active species may comprise lithium metal or a lithium alloy. As used herein, the term "cathode active species" may comprise any electrochemically active species associated with the cathode. For example, the cathode may comprise a lithium metal oxide (e.g., a lithium-doped cobalt oxide, lithium-doped nickel oxide, a lithium-doped manganese oxide, etc.), or a sulfur-containing material (e.g., elemental sulfur).

In another aspect, embodiments of the present invention provide methods of forming a GPE (e.g., a DES-based GPE). Such methods, for instance, may include radically-curing a GPE-composition (e.g., a pre-cured GPE-composition or pre-cured GPE-composition including a viscosity reducing agent) including a mixture of monomers. In this regard, the GPE-composition (e.g. a GPE-precursor composition) may comprise (i) a DES solution, (ii) a monomer-containing composition, and (iii) a water-in-salt (WiS) or a water-in-bisalt (WiBS) component comprising at least one electrolyte and water. For example, the method may comprise providing or combining (i) a deep eutectic solvent (DES) solution, (ii) a monomer-containing composition, and (iii) a water-in-salt (WiS) or a water-in-bisalt (WiBs) component comprising at least one electrolyte and water to form a GPE-composition, followed by radically curing the GPE composition to form the GPE.

Figure 4:
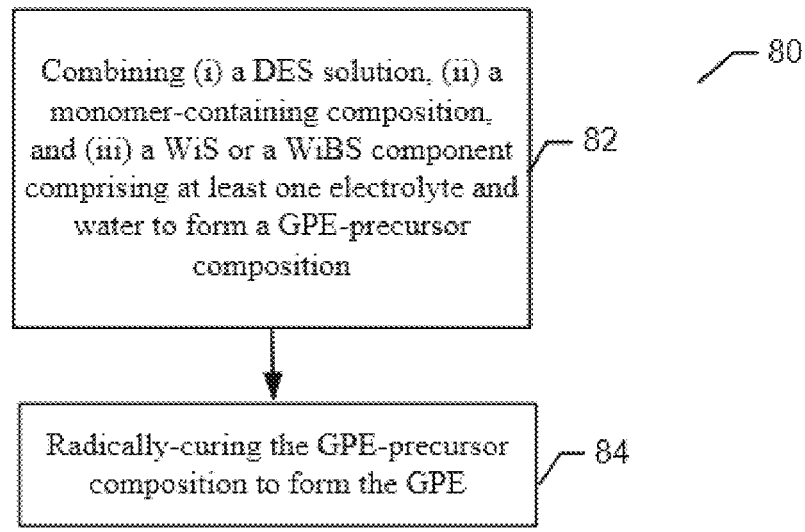
FIG. 4 illustrates a block diagram of a method for forming a DES-based GPE in accordance with certain embodiments of the invention.

FIG. 4, for example, illustrates a method 80 for forming a DES-based GPE in accordance with certain embodiments of the invention that may include combining (i) a DES solution, (ii) a monomer-containing composition, and (iii) a water-in-salt (WiS) or a water-in-bisalt (WiBs) component comprising at least one electrolyte and water to form a GPE-precursor composition at operation 82. The method 80 for forming a DES-based GPE may also include radically-curing the GPE-precursor composition to form the GPE at operation 84.

In accordance with certain embodiments of the invention, the method may comprise providing a GPE-composition (e.g., a pre-cured composition) comprising a three-dimensionally cross-linkable monomeric mixture, a DES solution, and a WiS or WiBS component comprising at least on electrolyte and water, in which the GPE-composition has a weight percentage of salt from about 20% to about 90%

(e.g., 20-90 wt. % of a salt), such as at least about any of the following: 20, 25, 30, 35, 40, 45, 50, 55, 60, 65, and 70 wt. % of salt and/or at least about any of the following: 90, 85, 80, 75, 70, 65, 60, 55, and 50 wt. % of a salt. The method may also comprise radically-curing the pre-cured composition, such as by a UV-curing operation or a thermal-curing operation. For instance, the GPE-composition may include a thermal initiator to facilitate thermal curing of the GPE-composition to form a GPE suitable for use in an electrochemical cell.

In accordance with certain embodiments of the invention, the step of radically-curing the GPE-composition may not be particularly limited as long as radicals are generated to promote curing or reaction (e.g. polymerization reaction) of the monomers in the GPE-composition. For instance, radically-curing the GPE-composition may include a photo-initiated process (e.g., UV or electron beam cure), chemically and/or thermally-initiated processes. For instance the GPE-composition may include at least one thermal initiator. The thermal initiator, for example, may comprise a self-accelerating decomposition from about 40° C. to about 120° C., such as at least about any of the following: 40, 50, 60, 70, and 80° C. and/or at most about any of the following: 120, 110, 110, 100, 90, and 80° C. In accordance with certain embodiments of the invention, the thermal initiator may be selected that has a decomposition rate that is sufficiently high enough at useful temperatures. In accordance with certain embodiments of the invention, the thermal initiator may be present in the GPE-composition from about 1-5% by weight of the GPE-composition, such as at least about any of the following: 1, 1.5, 2, 2.5, and 3% by weight of the GPE-composition and/or at most about any of the following: 5, 4.5, 4, 3.5, and 3% by weight of the GPE-composition.

In accordance with certain embodiments of the invention, the GPE-composition is devoid of an azo-based thermal initiator. The thermal initiator may comprise at least an organic peroxide or at least a peroxy ester. In accordance with certain embodiments of the invention, the thermal initiator may comprise any compound capable of producing radicals in response to temperature changes. Examples of classes of such compounds that exhibit this characteristic may include: diacyl peroxides, peroxyesters, peroxydicarbonates, dialkyl peroxides, ketone peroxides, peroxyketals, hydroperoxides, hydrogen peroxide, azo nitriles, azo esters, azo amides, azo imidazolines, azo amidines, and macromolecular azo compounds. Non-limiting examples of these compounds are dilauryl peroxide, dibenzoyl peroxide (BPO), tert-butyl perbenzoate, tert-butyl peroxyacetate, 2,4-pentanedione peroxide, methyl ethyl ketone peroxide, cumene hydroperoxide, tert-amyl peroxy-2-ethylhexyl carbonate, tert-buty peroxy isopropyl carbonate, di-tert-butyl peroxide, tert-amyl peroxybenzoate, di-tert-amyl peroxide, 2,5-dimethyl 2,5-di-(tert-butyl-peroxy)hexyne, 2,5-dimethyl 2,5-di-(tert-butyl-peroxy)hexane, di-2-tert-butylperoxy isopropyl benzene, dicumylperoxide, 1,1-di(tert-amylperoxy) cyclohexane, ethyl-3,3-di-tert-amyl peroxybutyrate, ethyl-3,3-di-tert-butyl peroxybutyrate, 1,1-di-tert-(butylperoxy) 3,3,5-trimethyl cyclohexane, N-butyl-4,4-bis-tert-butyl peroxyvalerate, 1,1-di-(tert-butylperoxy) cyclohexane, succinic acid peroxide, 2-hydroxy-1,1-dimethyl butylperoxyneodecanoate, tert-amyl peroxy-2-ethylhexanoate, tert-butyl peroxypivalate, tert-butyl peroxyneodecanoate, di-n-propyl peroxydicarbonate, di-2-ethylhexyl peroxydicarbonate, di-sec-butyl peroxydicarbonate, alpha-cumyl peroxyneoheptanoate, tert-amyl-peroxyneodecanoate, tert-amyl peroxypivalate, 2,5-dimethyl-2,5-bis-2-ethyl hexanoyl peroxy hexane, didecanoyl proxide, tert-butyl peroxy 2-ethylhexanoate, 4,4'-azobis(4-cyanovaleric acid), 1,1'-azobis(cyclohexane-1-carbonitrile), azobis(isobutyronitrile)(AIBN), 2,2'-azobis-(2-methylpropionamidine) dihydrochloride, 2,2'-azobis(4-methoxy-2,4-dimethylvaleronitrile), 2,2'-azobis(2,4-dimethylvaleronitrile), 2,2'azobis(2-methylbutyronitrile), dimethyl 2,2'azobis(2-methylpropionate), 2,2'-azobis[2-methyl-N-(2-hydroxyethyl)propionamide, 2,2'-azobis(N-butyl-2-methylpropionamide), 2,2'-azobis[2-(2-imidazolin-2-yl)propane]dihydrochloride, 2,2'-azobis[2-(2-imidazolin-2-yl)propane], 2,2'-azobis[N-(2-carboxyethyl)-2-methyl-propionamidine]tetrahydrate, 4,4-azobis(4-cyanovaleric acid) polymers and copolymers thereof, 4,4-azobis(4-cyanopentanoic acid) polymers and copolymers thereof, or mixtures of any of the above compounds. In accordance with certain embodiments of the invention, the thermal initiator (s) are those that do not produce gaseous byproducts during thermally-induced decomposition. For instance, generally peroxide based initiators are preferred to azo initiators as azo initiators generate gaseous byproducts. In accordance with certain embodiments of the invention, thermal initiators possessing a self-accelerating decomposition temperature (SADT)>approximately 50° C. may be particularly desirable since they can be most safely handled and formulated without special precaution or equipment. Non-limiting examples include dilauryl peroxide and dibenzoyl peroxide.

In accordance with certain embodiments of the invention, the method may further comprise incorporating a separator with the GPE. For instance, the method may comprise adhering a separator to a surface of the GPE or embedding a separator within the GPE. For example, the separator may comprise a variety of materials suitable for use in an electrochemical cell, such as cellulose, glass fibers, polyolefins, polyamides, polyethylene terephthalates, or any combinations thereof. The separator for example, may comprise a variety of forms, such as a mesh structure, a woven material, or a nonwoven material. In accordance with certain embodiments of the invention, the separator may be adhered to a surface of the GPE with the GPE at least partially penetrating into the openings or porous pathways of the separator without fully enveloping the separator. Such a configuration may be obtained, for example, by positioning the separator on a substrate, such as an electrode, and coating the separator with a GPE-composition followed by curing the GPE-composition to form a GPE including a separator located at a surface of the GPE. In accordance with certain embodiments of the invention, the GPE may include a separator that is fully embedded within the thickness of the GPE. For example, the separator may not be exposed to an ambient environment due to being fully encapsulated by the GPE. Such a configuration may be obtained, for example, by positioning the separator within a mold and pouring a GPE-composition inside the mold to fully encapsulate the separator followed by curing the GPE-composition to form a GPE including a separator fully embedded therein.

In accordance with certain embodiments of the invention, the methods of forming a GPE may comprise radically-curing a GPE-composition including a mixture of monomers comprising (i) a first group of monomers comprising at least a first monomer including at least three (3) thiol functional groups and a second monomer comprising, for example, an aliphatic chain including at least two (2) vinyl or at least one (1) alkyne functional groups; or (ii) a second group of monomers comprising at least a third monomer including an acrylate or methacrylate functional groups and a fourth polymer including at least two (2) free-radically polymerizable functional groups. In accordance with certain embodiments of the invention, the methods may comprise a step of mixing either the first group of monomers or the second group of monomers and adding an electrolyte alone and/or with water to provide the GPE-composition and depositing a coating of the GPE-composition onto a substrate prior to or during radically-curing the GPE-composition. In accordance with certain embodiments of the invention, the GPE-composition may comprise the combination of monomers, one or more electrolytes, optionally a viscosity reducing agent, and optionally a free radical initiator being, for example, mixed together and deposited (e.g., drop casting, dip coating, doctor blading, spin coating, stencil printing, screen printing, flexographic printing, inkjet printing, extrusion 3D printing, etc.) on a collection substrate (e.g., a semiconductor, a ceramic substrate, polymer substrate, a textile surface, a mold, etc.) and cured via generation of free radicals within the film coating on the substrate under conditions, depending on the type of initiator that may be used, which generates radicals at an appreciable rate to form a GPE in the form of a film (e.g., a hydrogel). In accordance with certain embodiments of the invention, the GPE may comprise a water-swellable hydrogel having a thickness from about 10 to about 500 microns, such as at most about any of the following: 500, 450, 400, 350, 300, 250, 200, 150, 100, 75, 50, 25, and 20 microns and/or at least about any of the following: 10, 11, 12, 13, 14, 15, 16, 17, 18, 19, 20, 25, 30, 35, 40, 45, and 50 microns.

In another aspect, embodiments of the present invention provide methods of forming an electrochemical cell. In accordance with certain embodiments of the invention, the methods may include providing an anode, providing a cathode, and depositing a GPE between and in contact with the anode and the cathode. In accordance with certain embodiments of the invention, depositing the GPE may comprise positioning a pre-fabricated GPE between the anode and the cathode or forming the GPE directly onto the anode or the cathode. In accordance with certain embodiments of the invention, depositing the GPE may comprise forming a first GPE-layer directly onto the anode and forming a second GPE-layer directly onto the cathode, and further comprising a step of joining the first GPE-layer and the second GPE-layer together such that the first GPE-layer and the second GPE-layer are located between the anode and the cathode.

In accordance with certain embodiments of the invention, the GPE may include a separator adhered or embedded therein as described and disclosed herein. Additionally or alternatively, the method may comprise positioning the separator on top of the cathode or anode followed by coating the separator and electrode supporting the separator with a GPE-composition and allowing or facilitating the GPE-composition to penetrate into the separator. After the GPE-composition has penetrated into the separator, the GPE-composition may be radically cured as described and disclosed herein.

EXAMPLES

The present disclosure is further illustrated by the following examples, which in no way should be construed as being limiting. That is, the specific features described in the following examples are merely illustrative and not limiting.

Materials

The following chemicals/abbreviations appear in the examples below:
BPO Benzoyl peroxide
DES Deep eutectic solvent
DMPA 2,2-Dimethoxy-2-phenylacetophenone
GPE Gel polymer electrolyte
HEA 2-Hydroxyethyl acrylate
H2O Water
LCO Lithium cobalt oxide (LiCoO2)
LiOTf Lithium trifluoromethane sulfonate
LiTFSI Lithium bis(trifluoromethane)sulfonamide
LFP Lithium iron phosphate (LiFePO4)
LMO Lithium manganese oxide (LiMnO4)
LTO Lithium titanate (Li4Ti5O12)
m molal (moles solute/Kg solvent)
mAh/g milliamp hour per gram
MPEGA-480 Poly(ethylene glycol) methyl ether acrylate, Mn~480 g/mol
NMA N-Methylacetamide
PC Propylene carbonate
PEGDA-700 Poly(ethylene glycol) diacrylate, Mn~700 g/mol
WiBS Water-in-bisalt (21 molal LiTFSI+7 molal LiOTf)
wt % Weight percent (mass component/mass of mixture)

In the set of following examples, each example is identified as either a "Comparative Example" or simply as an "Example". In this regard, the electrochemical cells described in each of the Comparative Examples do not reflect certain aspects of the present invention, while the electrochemical cells described in each of the Examples includes one or more features in accordance with certain aspects of the invention. Accordingly, electrochemical cell performance from the Examples may be compared with the electrochemical cells of the respective Comparative Examples.

Comparative Example 1: (Coin Cell Made Using Liquid WiBS Electrolyte)

Figure 5:
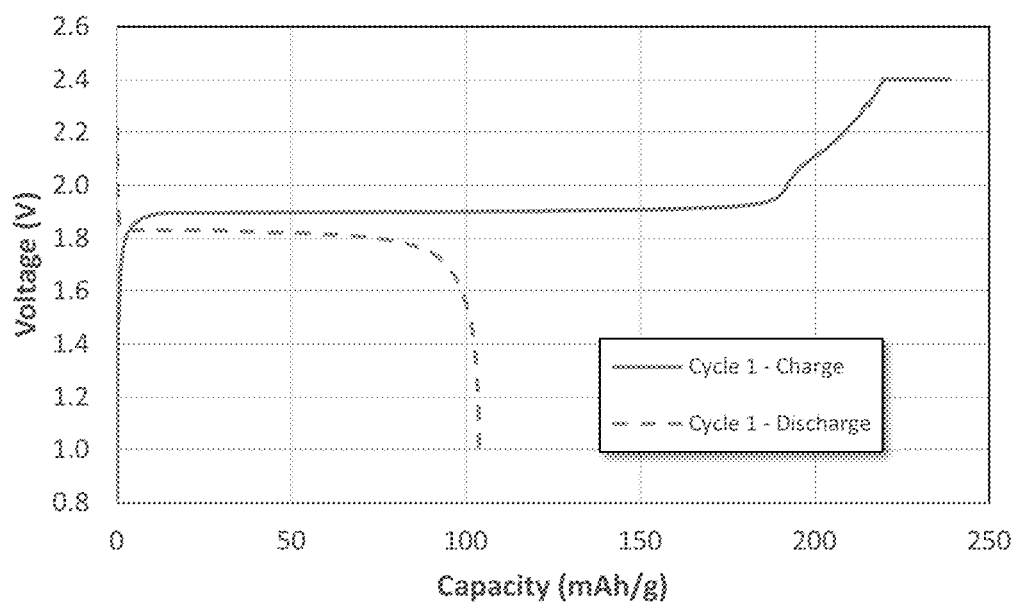
FIG. 5 illustrates the initial charge cycle for a comparative electrochemical cell.

A 2032 coin cell, consisting of an LTO anode (9.48 mg) and LFP cathode (7.98 mg) supported on aluminum current collectors, a glass fiber separator (STERILTECH GRADE C, 200 micron thickness), and 28 molal WiBS electrolyte (200 microliters of 74.2 wt % LiTFSI, 13.4 wt % LiOTf, and 12.3 wt % H2O) was prepared by sequentially topping the cathode with the separator, filling it with the electrolyte, then topping the separator with the anode. The resulting stack was then topped with the remaining coin cell cap, and subsequently crimped closed. The cells was then cycled. Data from the first charge and discharge cycles are shown in FIG. 5. FIG. 5, for instance, shows that the cell had a first cycle discharge capacity of 104 mAh/g. The cell also had a first cycle Columbic Efficiency of 43.6%.

Comparative Example 2: (Coin Cell Made Using WiBS-Based GPE Electrolyte)

Figure 6:
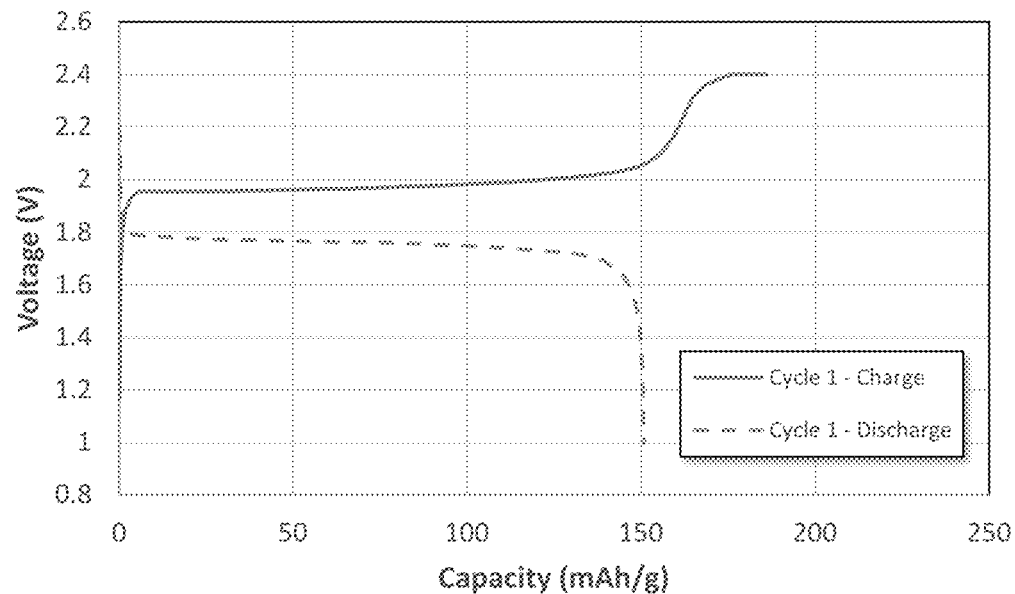
FIG. 6 illustrates the initial charge cycle for a comparative electrochemical cell.
Figure 7:
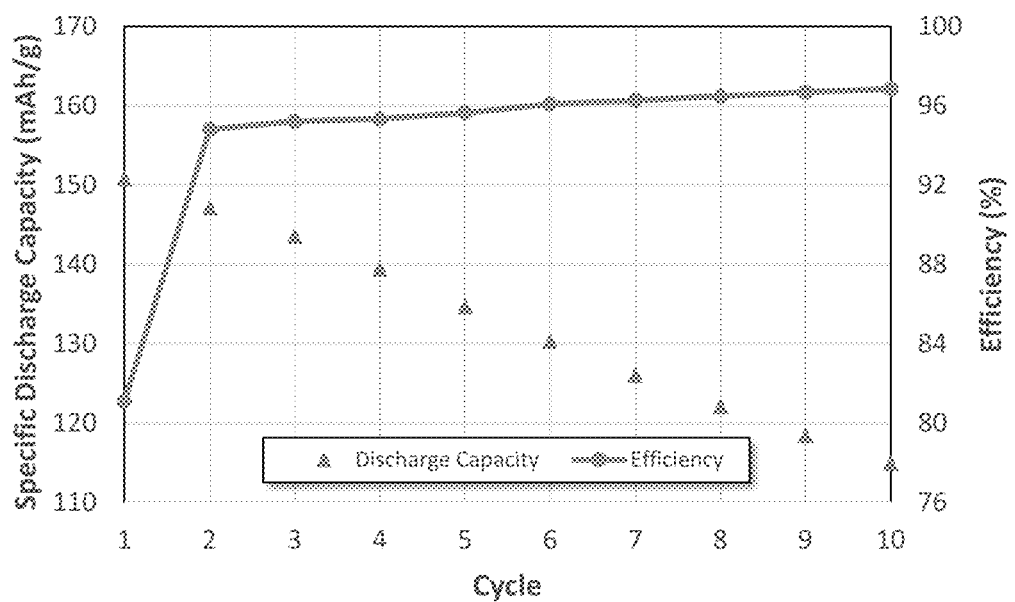
FIG. 7 illustrates the discharge capacity and efficiency for the first 10 cycles of the comparative electrochemical cell of FIG. 6.

A 2032 coin cell was prepared according to Comparative Example 1, except that the electrolyte used a mixture of 25 wt/monomer mixture, and 75 wt % WiBS. The monomer mixture consisted of 89 wt % MPEGA-480, 9 wt % HEA, 2 wt % PEGDA-700, and DMPA (0.5 wt % of the total monomers mass). The resulting mixture of monomers and WiBS is comprised of (55.7 wt % LiTFSI, 10.1 wt % LiOTf, 9.2 wt % H2O, 22.2% MPEGA-500, 2.2 wt % HEA, and 0.5 wt % PEGDA-700). During the cell assembly, the monomer and electrolyte mixture was irradiated for 30 seconds with UVB light (365 nm) for a total of 6 joules. Once cured, the GPE-soaked separator was topped the anode, and the cell assembly finished as described in Comparative Example 1. The cell was then cycled. Data from the first charge and discharge cycles are shown in FIG. 6. FIG. 6, for instance, shows that the cell had a first cycle discharge capacity of 150.8 mAh/g. FIG. 7 shows that the cell had a first cycle Columbic Efficiency of 81.1%.

Example 1: (Coin Cell Made Using Super Concentrated WiBS in Accordance with Certain Embodiments of the Invention)

Figure 8:
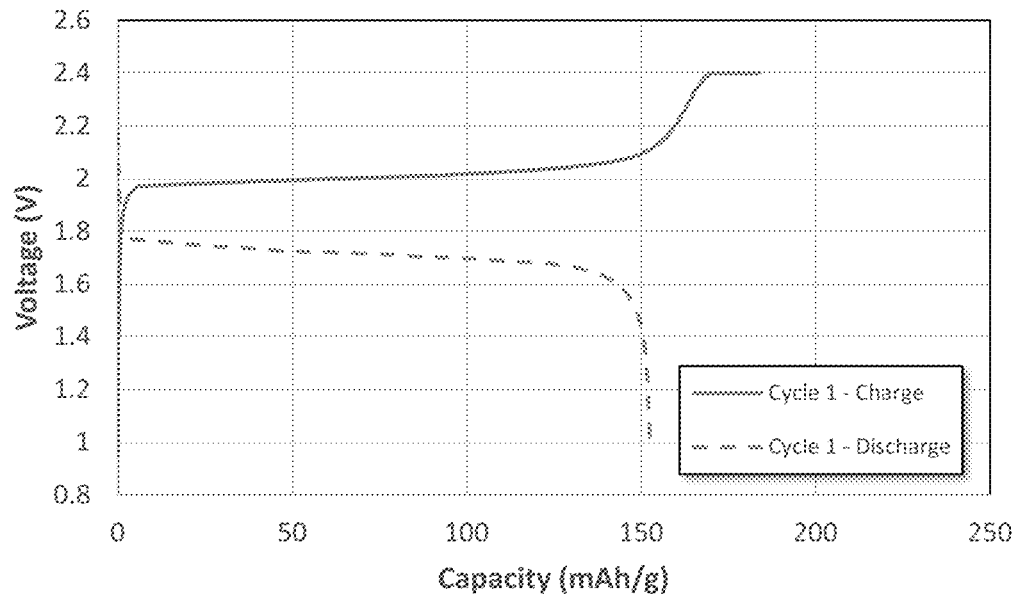
FIG. 8 illustrates the initial charge cycle for an electrochemical cell according to certain embodiments of the invention.
Figure 9:
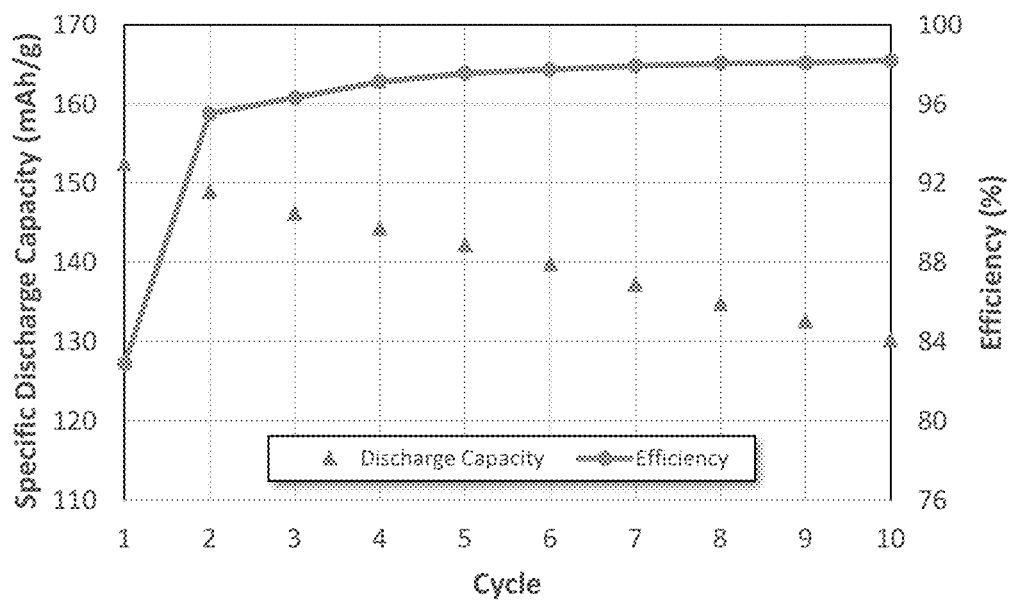
FIG. 9 illustrates the discharge capacity and efficiency for the first 10 cycles of the electrochemical cell of FIG. 8.

A 2032 coin cell was prepared according to Comparative Example 2, except that additional LiTFSI was added to the initial electrolyte mixture of monomers and WiBS. The resulting concentrated electrolyte mixture is comprised of (60 wt % LiTFSI, 7.8 wt % LiOTf, 7.2 wt % H2O, 22.2% MPEGA-500, 2.2 wt % HEA, and 0.5 wt % PEGDA-700). Following cell assembly as described in Comparative Example 2, the cell was then cycled. Data from the first charge and discharge cycles are shown in FIGS. 8 and 9. FIG. 8, for instance, shows that the cell had a first cycle discharge capacity of 152.5 mAh/g. FIG. 9 shows that the cell had a first cycle Columbic Efficiency of 82.9%. The cell also had higher cycling efficiency and discharge capacity after cycling (first 10 cycles shown) versus Comparative Example 2.

Comparative Example 3: (Thermally Cured, Pouch Cell with WiBS-Based GPE)

Figure 10:
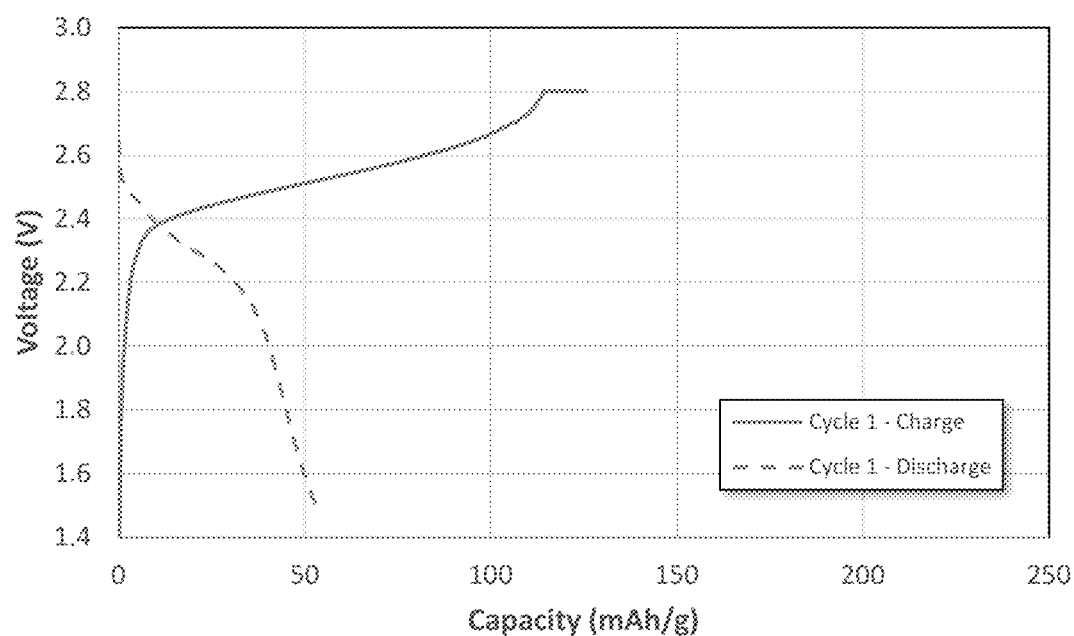
FIG. 10 illustrates the initial charge cycle for a comparative electrochemical cell.

A pouch cell was constructed containing an LTO anode (9.6 mg) and LMO cathode (14.8 mg), having an area of 1.61 cm2, supported on aluminum foil current collectors, and separated by a cellulose paper separator (20 micron thick). The pouch was heat sealed on three sides, before an electrolyte mixture comprised of 25 wt % monomer mixture and 75 wt % WiBS was added. The monomer mixture consisted of 89 wt % MPEGA-480, 9 wt % HEA, 2 wt % PEGDA-700, and BPO (1.9 wt % of the total monomers mass). The resulting electrolyte mixture of monomers and WiBS is comprised of (55.7 wt % LiTFSI, 10.1 wt % LiOTf, 9.2 wt % H2O, 22.2% MPEGA-500, 2.2 wt % HEA, and 0.5 wt % PEGDA-700). Following introduction of the electrolyte mixture, the pouch was vacuum sealed, and allowed to rest for at least 1 hour before it was heated to 110° C. for 80 minutes to thermally cure the electrolyte. The cell was then cycled. Data from the first charge and discharge cycles are shown in FIG. 10. FIG. 10 illustrates that the cell had a first cycle discharge capacity of 53 mAh/g. The cell also had a first cycle Columbic Efficiency of 42%.

Example 2: (Thermally Cured. Pouch Cell with DES-WiBS-Based GPE in Accordance with Certain Embodiments of the Invention)

Figure 11:
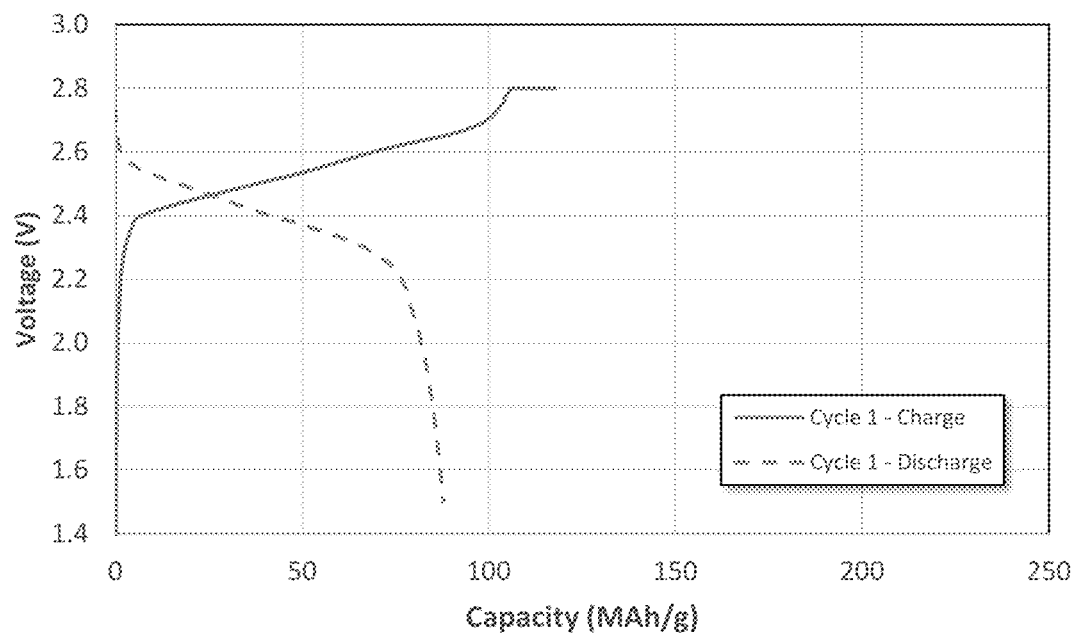
FIG. 11 illustrates the initial charge cycle for another electrochemical cell according to certain embodiments of the invention.

A pouch cell was constructed as described in Comparative Example 3, except that a portion of deep eutectic solvent comprised of NMA/LiTFSI (4:1 mole ratio) was added the initial electrolyte mixture of monomers and WiBS. The resulting DES-WiBS composite-based electrolyte consisted of 25 wt % monomers and 75 wt % WiBS:DES mixture (1:1), and is comprised of (46.4 wt % LiTFSI, 5.0 wt % LiOTf, 4.6 wt % H2O, 18.9 wt % NMA, 22.2 wt %/MPEGA-480, 2.2 wt % HEA, 0.5 wt % PEGDA-700). Following introduction of the electrolyte mixture, vacuum sealing of the pouch, and resting, the pouch was heated to 110° C. for 80 minutes to thermally cure the electrolyte. The cell was then cycled. Data from the first charge and discharge cycles are shown in FIG. 11. FIG. 11 shows that the cell had a first cycle discharge capacity of 87.9 mAh/g. The cell also had a first cycle Columbic Efficiency of 74.6%.

Example 3: (Thermally Cured, Pouch Cell with DES-WiBS-Based GPE in Accordance with Certain Embodiments of the Invention)

Figure 12:
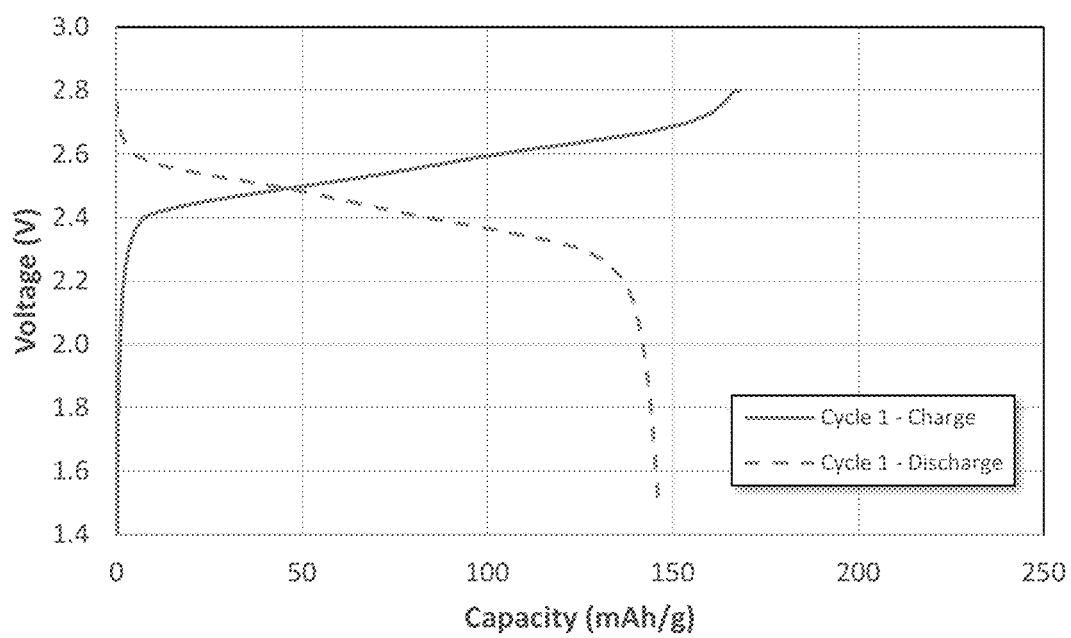
FIG. 12 illustrates the initial charge cycle for another electrochemical cell according to certain embodiments of the invention.

A pouch cell was constructed as described in Comparative Example 3, except that a portion of deep eutectic solvent comprised of NMA/LiTFSI (4:1 mole ratio) was added the initial electrolyte mixture of monomers and WiBS. The resulting DES-WiBS composite-based electrolyte consisted of 25 wt % monomers and 75 wt % WiBS:DES mixture (9:1), and is comprised of (53.8 wt % LiTFSI, 9.0 wt % LiOTf, 8.3 wt % H2O, 3.8 wt % NMA, 22.2 wt % MPEGA-480, 2.2 wt % HEA, 0.5 wt % PEGDA-700). Following introduction of the electrolyte mixture, vacuum sealing of the pouch, and resting, the pouch was heated to 110° C. for 80 minutes to thermally cure the electrolyte. The cell was then cycled. Data from the first charge and discharge cycles are shown in FIG. 12. FIG. 12 shows that the cell had a first cycle discharge capacity of 146 mAh/g. The cell also had a first cycle Columbic Efficiency of 86.9%.

Comparative Example 4: (V Cured Pouch Cell with Super Concentrated WiBS Electrolyte)

Figure 13:
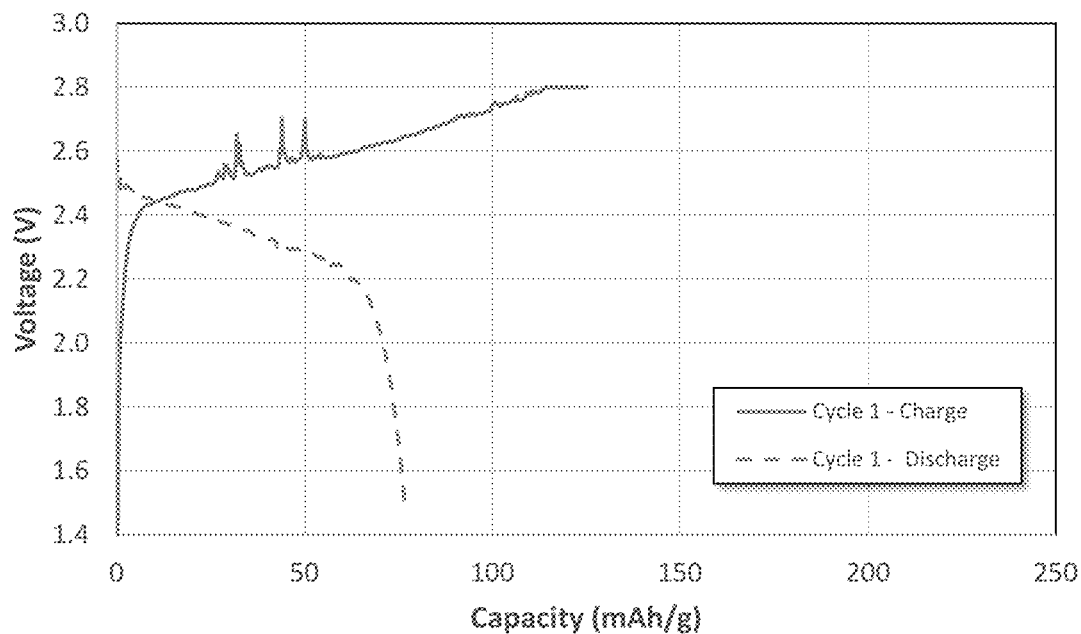
FIG. 13 illustrates the initial charge cycle for a comparative electrochemical cell.

A pouch cell was constructed by first coating an LTO anode (156 mg), LMO cathode (276 mg), and glass fiber separator with an electrolyte mixture of monomers (containing 0.5 wt % DMPA, based on total monomer mass) and super concentrated WiBS. The electrolyte mixture was comprised of (60 wt % LiTFSI, 7.8 wt % LiOTf, 7.2 wt % H2O, 22.2% MPEGA-500, 2.2 wt % HEA, and 0.5 wt % PEGDA-700). The electrolyte-coated LTO, LMO, and separator were separately irradiated for 30 seconds with UVB light (365 nm) for a total of 6 joules. Once cured, the GPE-soaked cathode was topped with the GPE-soaked separator, which was then topped with the GPE-soaked anode. The resulting stack was placed in a pouch cell and vacuum sealed. The cell was then cycled. Data from the first charge and discharge cycles are shown in FIG. 13. FIG. 13 shows that the cell had a first cycle discharge capacity of 77 mAh/g. The cell had a first cycle Columbic Efficiency of 62%.

Example 4: (UV Cured Pouch Cell with Concentrated WiBS Electrolyte with Added PC in Accordance with Certain Embodiments of the Invention)

Figure 14:
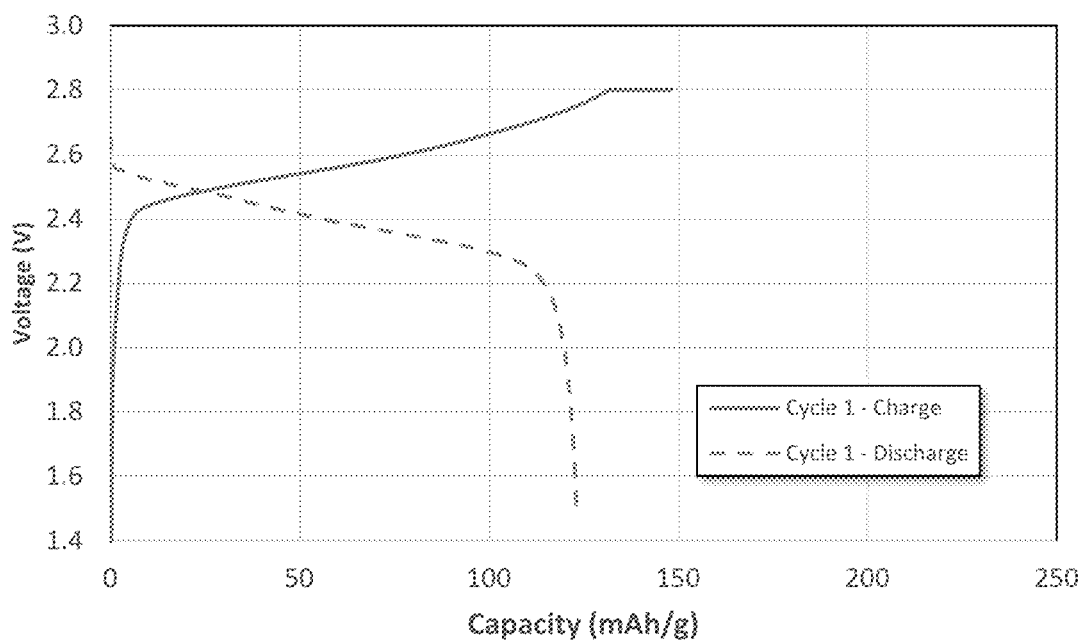
FIG. 14 illustrates the initial charge cycle for another electrochemical cell according to certain embodiments of the invention.

A pouch cell was constructed as described in Comparative Example 4 except that a portion of propylene carbonate (PC) was added to the electrolyte consisting of a mixture of monomers and super concentrated WiBS. The resulting electrolyte mixture was comprised of (57.3 wt % LiTFSI, 7.0 wt % LiOTf, 6.5 wt % H2O, 4.2 wt % PC, 22.2% MPEGA-500, 2.2 wt % HEA, and 0.5 wt % PEGDA-700). Data from the first charge and discharge cycles are shown in FIG. 14. FIG. 14 shows a first cycle discharge capacity of 123 mAh/g. The cell had a first cycle Columbic Efficiency of 83%, which was higher than that of Comparative Example 4.

Example 5: (UV Cured Pouch Cell with Concentrated WiBS Electrolyte with Added PC in Accordance with Certain Embodiments of the Invention)

Figure 15:
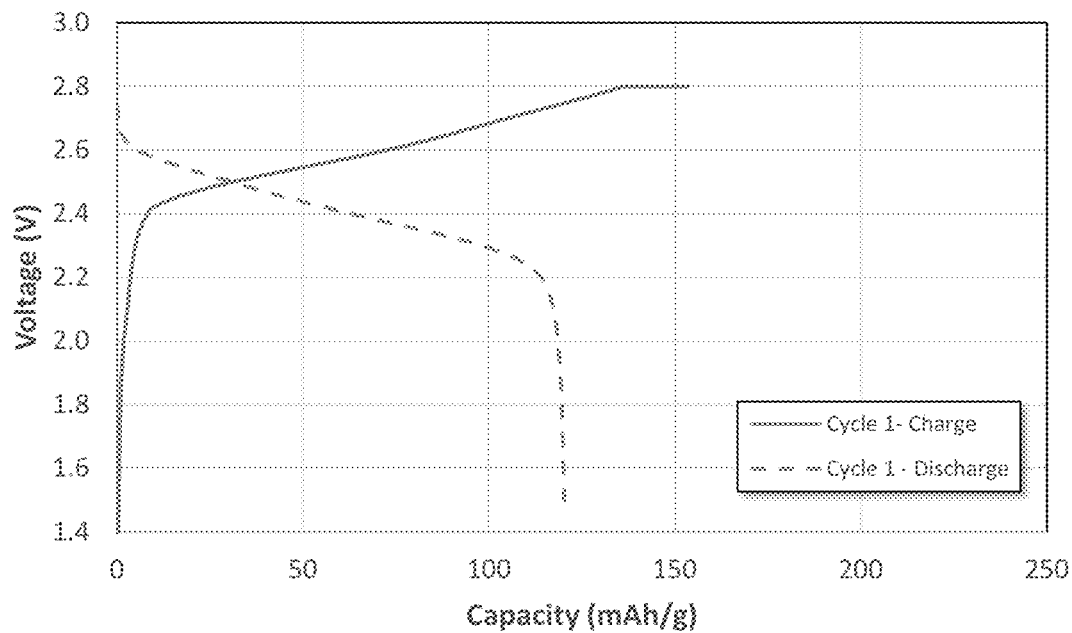
FIG. 15 illustrates the initial charge cycle for another electrochemical cell according to certain embodiments of the invention.

A pouch cell was constructed as described in Comparative Example 4 except that a portion of propylene carbonate (PC) was added to the electrolyte consisting of a mixture of monomers (containing 0.5 wt % DMPA based on total monomer mass) and super concentrated WiBS. The resulting electrolyte mixture was comprised of (46.6 wt % LiTFSI, 3.9 wt % LiOTf, 3.5 wt % H2O, 20.9, wt % PC, 22.2% MPEGA-500, 2.2 wt % HEA, and 0.5 wt % PEGDA-700). Data from the first charge and discharge cycles are shown in FIG. 15. FIG. 15 shows that the cell had a first cycle discharge capacity of 120 mAh/g. The cell has a first cycle Columbic Efficiency of 78%, which was higher than that of Comparative Example 4.

Example 6: (Thermally-Cured Pouch Cell with DES-GPE Electrolyte in Accordance with Certain Embodiments of the Invention)

Figure 16:
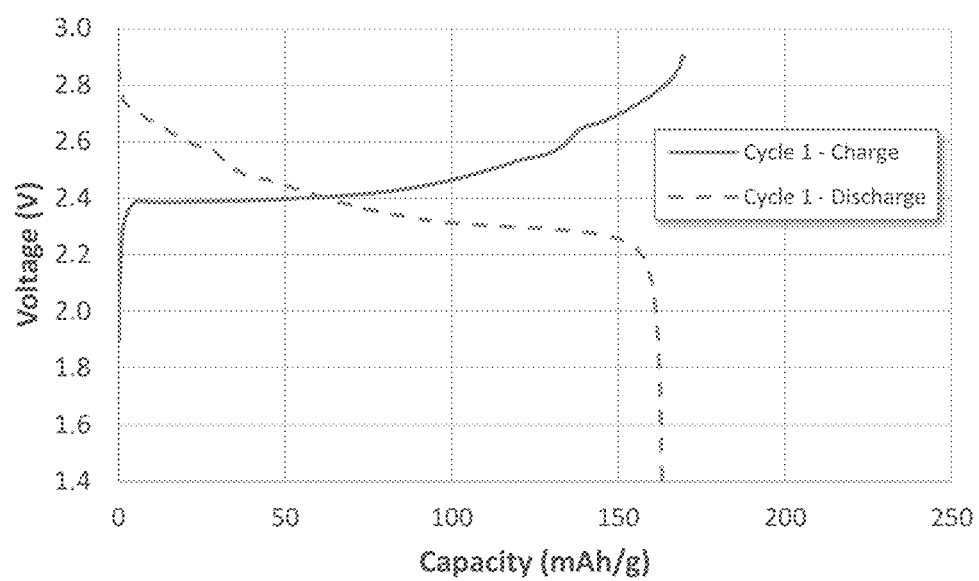
FIG. 16 illustrates the initial charge cycle for another electrochemical cell according to certain embodiments of the invention.

A pouch cell was constructed containing an LTO anode (41.6 mg) and LCO cathode (50.3 mg), having an area of 6.45 cm2, supported on aluminum foil current collectors, and separated by a cellulose paper separator (20 micron thick). The pouch was heat sealed on three sides, before an electrolyte mixture comprised of 20 wt % monomer mixture and 80 wt % DES (NMA:LiTFSI 4:1 mole ratio) was added. The monomer mixture consisted of 90 wt % MPEGA-480, 10 wt % PEGDA-700, and BPO (1.0 wt % of the total monomers mass). The resulting electrolyte mixture of monomers and DES is comprised of (39.6 wt % LiTFSI, 40.4 wt % NMA, 18% MPEGA-500, and 2 wt % PEGDA-700). Following introduction of the electrolyte mixture, the pouch was vacuum sealed, and allowed to rest for at least 1 hour before it was heated to 80° C. for 180 minutes to thermally cure the electrolyte. The cell was then cycled. Data from the first charge and discharge cycles are shown in FIG. 16. FIG. 16 shows that the cell had a first cycle discharge capacity of 163.3 mAh/g. The cell has a first cycle Columbic Efficiency of 96.3%.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A method of forming a gel polymer electrolyte (GPE), comprising:
   (i) providing a pre-cured composition comprising (a) a three-dimensionally cross-linkable monomeric mixture including at least a first monomer including an acrylate or methacrylate functional group and a second monomer or oligomer having at least two free-radically polymerizable functional groups comprising at least one acrylate group or methacrylate group, (b) at least one electrolyte salt, (c) a free-radical initiator, and (d) water; wherein the pre-cured composition has a molar concentration of the at least one electrolyte salt above 35 M; and
   (ii) curing the pre-cured composition via free-radical-mediated polymerization to form the GPE, wherein the GPE comprises (a) a cross-linked three-dimensional polymer network, (b) the at least one electrolyte, and (c) water.

2. The method of forming the gel polymer electrolyte (GPE) of claim 1, wherein the free-radical initiator comprises at least one thermal initiator and the step of curing the pre-cured composition comprises thermally-curing the pre-cured composition.

3. The method of forming the gel polymer electrolyte (GPE) of claim 1, wherein the GPE is formed into a film having a thickness from about 10 to 500 microns.

4. The method of forming the gel polymer electrolyte (GPE) of claim 1, wherein the three-dimensionally cross-linkable monomeric mixture further comprises a third monomer having an acrylate or methacrylate functional group, and wherein the first monomer is different from the third monomer.

5. The method of forming the gel polymer electrolyte (GPE) of claim 1, wherein the at least one electrolyte salt is selected from the group consisting of a lithium salt, a zinc salt, and combination thereof.

6. The method of forming the gel polymer electrolyte (GPE) of claim 1, further comprising positioning a separator within a mold and pouring the pre-cured composition inside the mold and encapsulating the separator prior to curing the pre-cured composition.

7. The method of forming the gel polymer electrolyte (GPE) of claim 1, further comprising positioning a separator on a substrate followed by coating the separator with the pre-cured composition prior to curing the pre-cured composition.

\* \* \* \* \*